United States Patent
Tsumemitsu

(10) Patent No.: US 12,547,304 B2
(45) Date of Patent: Feb. 10, 2026

(54) INFORMATION PROCESSING SYSTEM, METHOD, AND NON-TRANSITORY COMPUTER READABLE MEDIUM FOR DISPLAYING ENLARGED IMAGE CORRESPONDING TO A FILE IMAGE

(71) Applicant: FUJIFILM Business Innovation Corp., Tokyo (JP)

(72) Inventor: Masaya Tsumemitsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 507 days.

(21) Appl. No.: 17/894,491

(22) Filed: Aug. 24, 2022

(65) Prior Publication Data

US 2023/0325060 A1    Oct. 12, 2023

(30) Foreign Application Priority Data

Mar. 24, 2022 (JP) ................. 2022-049109

(51) Int. Cl.
G06F 3/04845 (2022.01)
G06F 3/04817 (2022.01)
G06F 3/04842 (2022.01)

(52) U.S. Cl.
CPC ...... *G06F 3/04845* (2013.01); *G06F 3/04817* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 5,598,183 A | * | 1/1997 | Robertson | G06F 3/04812 345/157 |
| 6,512,529 B1 | * | 1/2003 | Janssen | G06F 9/451 715/837 |
| 2003/0011639 A1 | * | 1/2003 | Webb | G06F 3/0481 715/808 |
| 2008/0034306 A1 | * | 2/2008 | Ording | G06F 16/743 715/764 |
| 2008/0307350 A1 | * | 12/2008 | Sabatelli | G06F 3/0481 715/779 |
| 2009/0094553 A1 | * | 4/2009 | Karstens | G06F 3/04817 715/810 |
| 2018/0143947 A1 | * | 5/2018 | Jain | H04L 67/01 |

FOREIGN PATENT DOCUMENTS

| | | | | |
|---|---|---|---|---|
| GB | 2438763 A | * | 12/2007 | ........ G06F 3/0481 |
| JP | 2004-54839 A | | 2/2004 | |
| JP | 2011-211621 A | | 10/2011 | |
| JP | 4821529 B2 | | 11/2011 | |
| WO | 2015/159360 A1 | | 10/2015 | |

OTHER PUBLICATIONS

Dec. 2, 2025 Office Action issued in Japanese Patent Application No. 2022-049109.

* cited by examiner

*Primary Examiner* — Henry Orr
(74) *Attorney, Agent, or Firm* — Oliff PLC

(57) ABSTRACT

An information processing system includes a processor configured to: display an enlarged image that corresponds to a file image and that is larger in display size than the file image on a display unit in a case where the file image is selected, the file image being an image corresponding to a file and displayed on the display unit; and maintain display of the enlarged image while a pointer image that indicates a location on the display unit at which an operation is performed by a user is located on the enlarged image.

15 Claims, 18 Drawing Sheets

INFORMATION PROCESSING SYSTEM, METHOD, AND NON-TRANSITORY COMPUTER READABLE MEDIUM FOR DISPLAYING ENLARGED IMAGE CORRESPONDING TO A FILE IMAGE

CROSS-REFERENCE TO RELATED APPLICATIONS

This application is based on and claims priority under 35 USC 119 from Japanese Patent Application No. 2022-049109 filed Mar. 24, 2022.

BACKGROUND

(i) Technical Field

The present disclosure relates to an information processing system, a method, and a non-transitory computer readable medium.

(ii) Related Art

Japanese Unexamined Patent Application Publication No. 2011-211621 discloses a process of displaying an enlarged image of an enlarged smiling face in a thumbnail display area when a smile icon is clicked, and displaying an enlarged image of an enlarged non-smiling face in the thumbnail display area when a face icon is clicked.

Japanese Unexamined Patent Application Publication No. 2004-54839 discloses a process of automatically extracting an area included in a document image and displaying an attribute icon corresponding to the extracted area when a thumbnail of the document image is to be displayed as a file icon.

Japanese Patent No. 4821529 discloses a process of determining a display condition for displaying an image as enlarged on a screen on the basis of information on an operation on a recognized thumbnail image, and displaying the image as enlarged in accordance with the determined display condition.

SUMMARY

In the case where a file image corresponding to a file is selected, user convenience is improved if an enlarged image that is larger in display size than the file image is displayed on a display unit, which makes it easier for a user to reference the content of the file etc.

It is conceivable to display the enlarged image when a pointer image that indicates the location of an operation by the user is located on the file image and hide the enlarged image when the pointer image is located off the file image, in order to make it easy for the user to switch to display and hide the enlarged image. In such a manner, however, the user may not reference a content by moving the pointer image onto the enlarged image, or operate the enlarged image or a file by selecting a menu image displayed on the enlarged image.

Aspects of non-limiting embodiments of the present disclosure relate to making it easy for a user to reference or operate an enlarged image displayed when a file image is selected compared to the case where display of the enlarged image is maintained only when a pointer image that indicates the location of an operation by the user is placed on the file image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to: display an enlarged image that corresponds to a file image and that is larger in display size than the file image on a display unit in a case where the file image is selected, the file image being an image corresponding to a file and displayed on the display unit; and maintain display of the enlarged image while a pointer image that indicates a location on the display unit at which an operation is performed by a user is located on the enlarged image.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail below with reference to the accompanying drawings.

Figure 1:
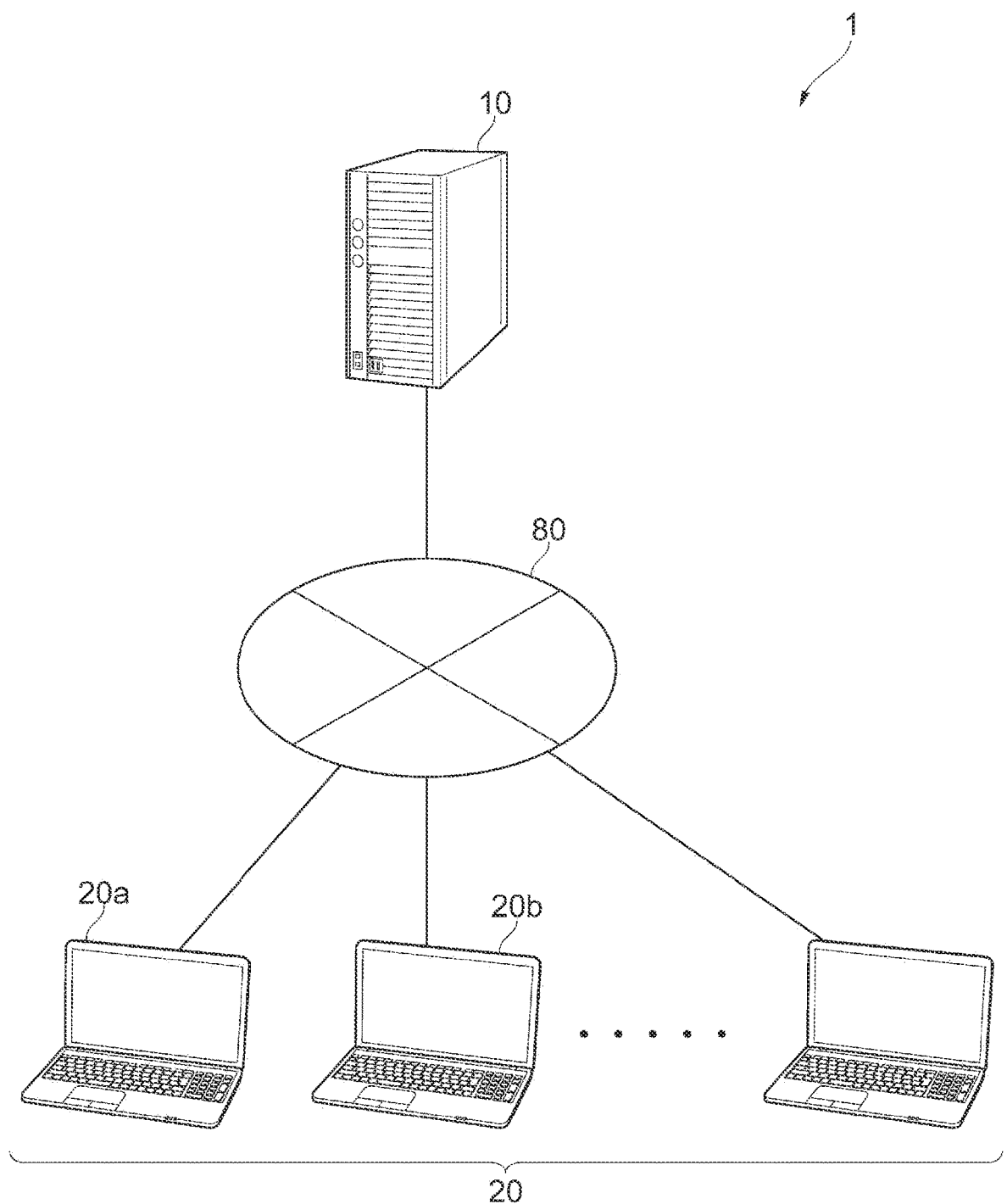
FIG. 1 illustrates the overall configuration of an information processing system.

FIG. 1 illustrates an example of the overall configuration of an information processing system 1 according to the present exemplary embodiment.

The information processing system 1 according to the present exemplary embodiment is constituted by connecting a server device 10 that manages files and terminal apparatuses 20 (20a, 20b, . . . ) that are used by users to view the files via a communication line 80.

The communication line 80 may be a line such as the Internet, for example, and is used for information communication among the server device 10 and the terminal apparatuses 20. In the information processing system 1 according to the present exemplary embodiment, files uploaded to the server device 10 are viewed and edited by the terminal apparatuses 20.

The term "files" as used herein refers to electronic files stored in the server device 10 etc.

The files may include an image in addition to a text, and may include only an image without including a text. The files may include not only document data or image data, but also information that is used to convert document data into an image and attribute information such as the date and time of update of the files, paper size, number of pages, and keywords in the files.

The server device 10 is a device that manages files updated from the terminal apparatuses 20. The files managed by the server device 10 may be shared by a plurality of users, and edited by one or a plurality of users.

The server device 10 is implemented by a computer device, for example. The server device 10 may be constituted by a single computer, or may be implemented by a plurality of computers through distributed processing.

The terminal apparatuses 20 are each a device that is used to view and edit the files managed by the server device 10.

The terminal apparatus 20 includes a display unit that displays images corresponding to the files. The terminal apparatus 20 includes a computer device. Examples of the terminal apparatus 20 include a desktop personal computer, a notebook personal computer, a tablet information terminal, a smartphone, and a gaming device.

The hardware configuration of the server device 10 will be described.

Figure 2:
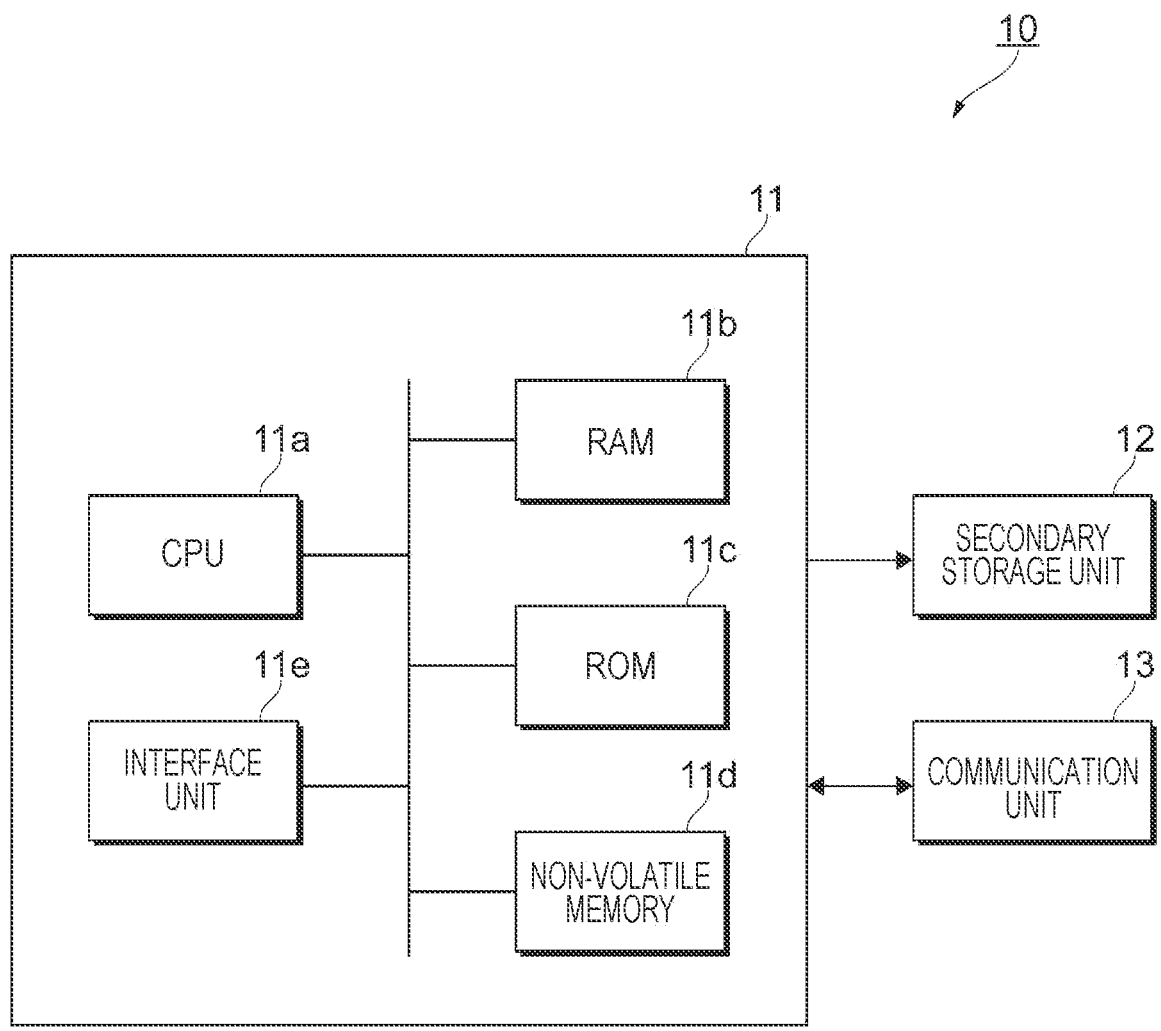
FIG. 2 is a block diagram illustrating an example of the hardware configuration of a server device.

FIG. 2 is a block diagram illustrating an example of the hardware configuration of the server device 10 according to the present exemplary embodiment.

The server device 10 includes a computation processing unit 11 that executes a digital computation process in accordance with a program for managing files, a secondary storage unit 12 that stores the files etc., and a communication unit 13 that transmits and receives information via the communication line 80 (see FIG. 1).

The secondary storage unit 12 is implemented by an existing information storage device such as a hard disk drive (HDD), a semiconductor memory, and a magnetic tape, for example.

The computation processing unit 11 is provided with a central processing unit (CPU) 11a as an example of a processor. The CPU 11a controls the entire server device 10.

The computation processing unit 11 includes a random access memory (RAM) 11b that is used as a work memory etc. for the CPU 11a and a read only memory (ROM) 11c that stores the program etc. to be executed by the CPU 11a.

The computation processing unit 11 also includes a non-volatile memory 11d configured to be rewritable and capable of holding data even in the case where power supply is interrupted, and an interface unit 11e that controls various units, such as the communication unit 13, connected to the computation processing unit 11.

The non-volatile memory 11d is constituted from a static RAM (SRAM) backed up by a battery, a flash memory, etc., for example. The non-volatile memory 11d stores information on the files, correlation information for correlating the files, etc.

The secondary storage unit 12 stores the files etc., and stores the program to be executed by the computation processing unit 11.

In the present exemplary embodiment, the server device 10 executes various processes by the computation processing unit 11 reading the program stored in the secondary storage unit 12. The computation processing unit 11, the secondary storage unit 12, and the communication unit 13 are connected to each other through a bus or a signal line.

The server device 10 executes processes such as acquiring new files, extracting the files, correlating the files, and reflecting the content of update of the files in response to a request etc. from the terminal apparatus 20.

The server device 10 also provides the terminal apparatus 20 with the files, the result of search processes, and various kinds of information such as update information in response to a request etc. from the terminal apparatus 20.

In the present exemplary embodiment, the secondary storage unit 12 stores files etc. The communication unit 13 receives a request etc. from the terminal apparatus 20, and transmits the requested files etc.

The programs to be executed by the CPU 11a of the server device 10 may be provided to the server device 10 as stored in a computer-readable storage medium such as a magnetic storage medium (such as a magnetic tape and a magnetic disk), an optical storage medium (such as an optical disc), a magneto-optical storage medium, and a semiconductor memory. Alternatively, the programs to be executed by the CPU 11a may be provided to the server device 10 using a communication unit such as the Internet.

Next, the hardware configuration of the terminal apparatus 20 will be described.

Figure 3:
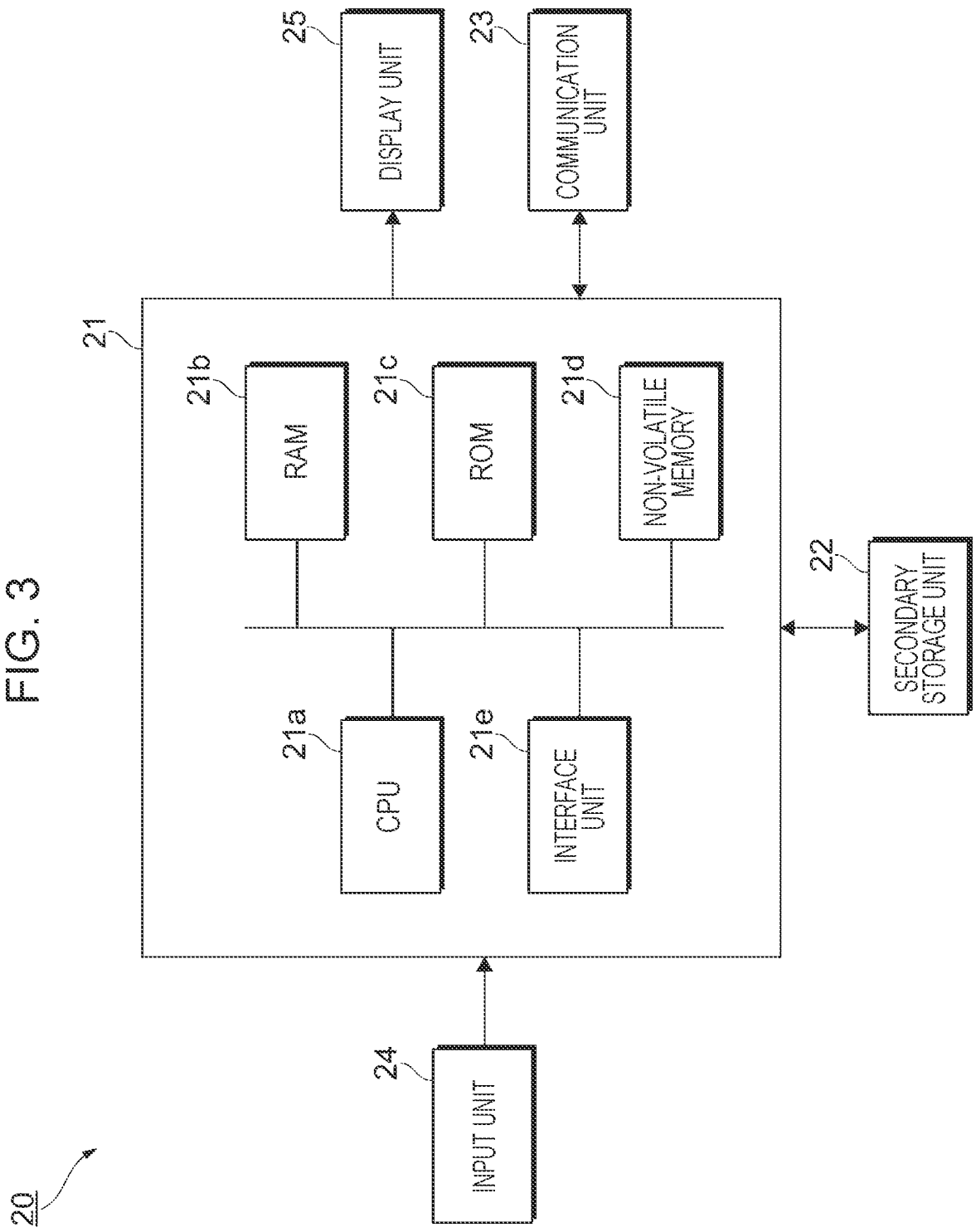
FIG. 3 is a block diagram illustrating an example of the hardware configuration of a terminal apparatus.

FIG. 3 is a block diagram illustrating an example of the hardware configuration of the terminal apparatus 20.

The terminal apparatuses 20 according to the present exemplary embodiment each include a computation processing unit 21 that executes an image display process in accordance with a program, a secondary storage unit 22 that stores the files etc., and a communication unit 23 that transmits and receives information via the communication line 80 (see FIG. 1).

The terminal apparatuses 20 each also include an input unit 24 that receives an input operation from a user, and a display unit 25 that displays an image, text information, etc. to the user. The display unit 25 is constituted of a liquid crystal display panel, an organic electro-luminescence (EL) display panel, etc., for example.

The secondary storage unit 22 is implemented by an existing information storage device such as a hard disk drive (HDD), a semiconductor memory, and a magnetic tape, for example.

The computation processing unit 21 includes a CPU 21a as an example of a processor. The CPU 21a controls the entire terminal apparatus 20.

The computation processing unit 21 includes a RAM 21b that is used as a work memory etc. for the CPU 21a and a ROM 21c that stores the program etc. to be executed by the CPU 21a.

The computation processing unit 21 also includes a non-volatile memory 21d that is rewritable and that is capable of holding data even in the case where power supply is interrupted, and an interface unit 21e that controls various units, such as the communication unit 23, connected to the computation processing unit 21.

The non-volatile memory 21*d* is constituted from an SRAM backed up by a battery, a flash memory, etc., for example, and stores the files, update information, etc.

The secondary storage unit 22 stores the files etc., and stores the program to be executed by the computation processing unit 21. The terminal apparatus 20 executes various processes by the computation processing unit 21 reading the program stored in the secondary storage unit 22.

The computation processing unit 21, the secondary storage unit 22, and the communication unit 23 are connected to each other through a bus or a signal line.

The input unit 24 may be a pointing device etc. that is operated by the user to input information.

In the case where the input unit 24 is a mouse, for example, the user designates a position on a display screen displayed on the display unit 25, designates an image displayed on the display unit 25, and moves the designated image by performing an operation to move a pointer image or a click operation.

In the case where the input unit 24 is a touch screen, meanwhile, the user performs an operation to touch the touch screen with a finger etc. or an operation to move the finger touching the touch screen. This allows the user to designate a position on a display screen displayed on the display unit 25, designate an image displayed on the display unit 25, and move the designated image.

The terminal apparatus 20 is occasionally provided with a touch screen. In this case, the input unit 24 and the display unit 25 are provided integrally with each other.

The input unit 24 may be a keyboard that allows performing an input operation using keys, besides the pointing device described above.

The programs to be executed by the CPU 21*a* of the terminal apparatus 20 may be provided to the terminal apparatus 20 as stored in a computer-readable storage medium such as a magnetic storage medium (such as a magnetic tape and a magnetic disk), an optical storage medium (such as an optical disc), a magneto-optical storage medium, and a semiconductor memory. Alternatively, the programs to be executed by the CPU 21*a* may be provided to the terminal apparatus 20 using a communication unit such as the Internet.

In the embodiment herein described, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment herein described, the term "processor" is broad enough to encompass one processor or plural processors in collaboration which are located physically apart from each other but may work cooperatively. The order of operations of the processor is not limited to one described in the embodiment herein described, and may be changed.

Display on the display unit 25 of the terminal apparatus 20 will be described with reference to FIGS. 4A and 4B (which each illustrate an example of display on the display unit 25).

In the present exemplary embodiment, the CPU 11*a* (see FIG. 2) of the server device 10 as an example of a processor generates information to be used to control display on the display unit 25 of the terminal apparatus 20. Then, the terminal apparatus 20 performs display control in accordance with the information. This allows the display unit 25 of the terminal apparatus 20 to display various types of screens to be described below.

The information to be used to control display on the display unit 25 of the terminal apparatus 20 may be generated by the terminal apparatus 20, rather than by the server device 10. Alternatively, the server device 10 may generate a part of the information to be used for control, and the terminal apparatus 20 may generate another part of such information.

Figure 4A:
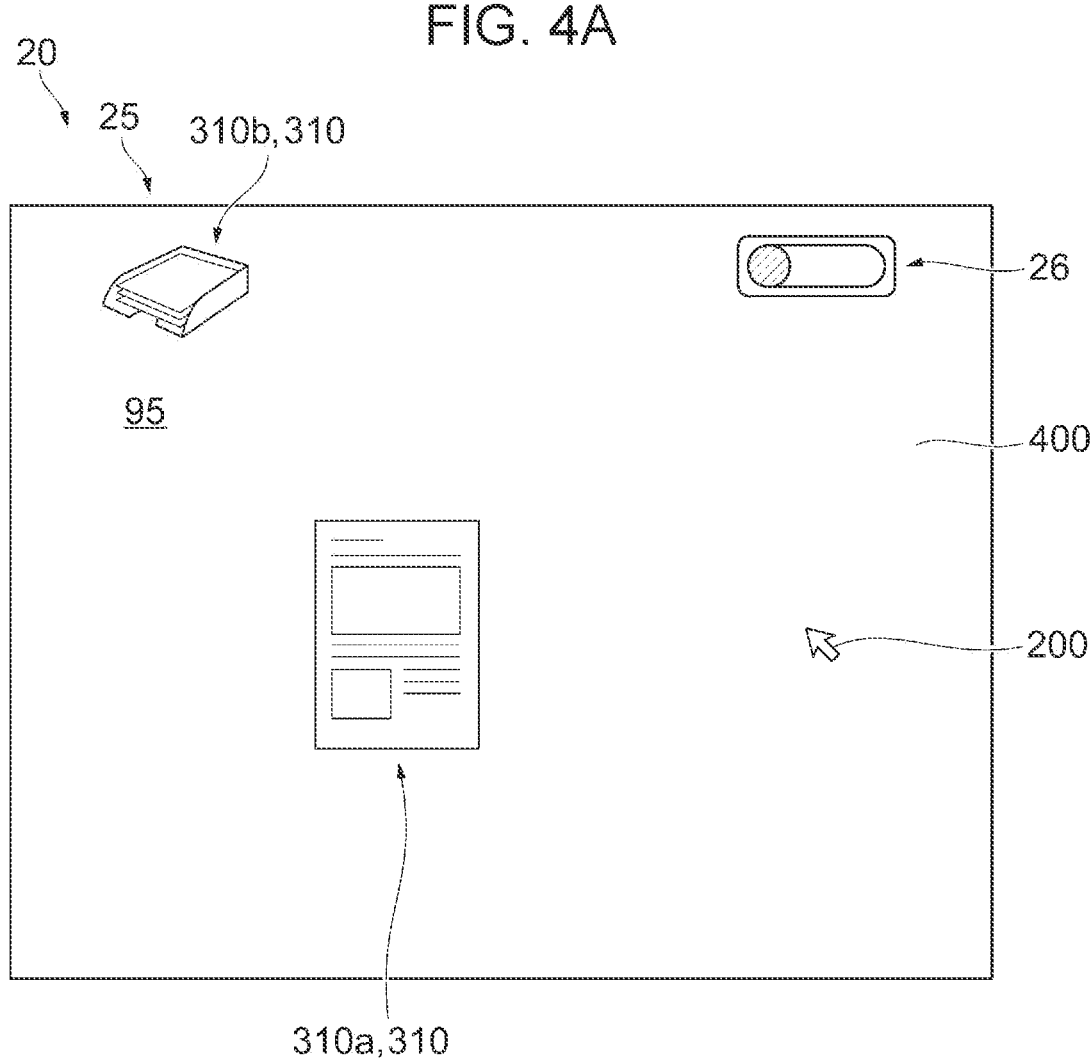
FIGS. 4A and 4B illustrate an example of display on a display unit.
Figure 4B:
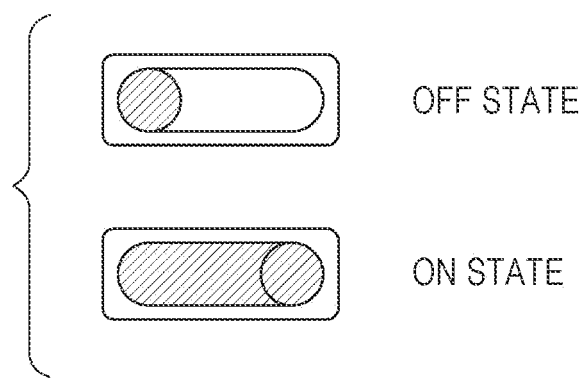

In the present exemplary embodiment, as illustrated in FIG. 4A, a work space 400 on so-called file handling software is displayed on the display unit 25 of the terminal apparatus 20.

The file handling software is software that manages digitalized documents, and has a function of promoting consolidated management of paper and electronic documents.

A pointer image 200 that indicates a location at which the user is performing an operation on the display unit 25 is further displayed on the display unit 25. The pointer image 200 is moved in accordance with an operation of the mouse etc. by the user. In other words, the pointer image 200 is moved in accordance with an operation by the user on the input unit 24 (see FIG. 3).

The pointer image 200 is also referred to as a "cursor". While the pointer image 200 is in an arrow shape in the present exemplary embodiment, the shape of the pointer image 200 is not limited as long as the pointer image 200 is moved in accordance with an operation by the user.

The user moves the pointer image 200 to a position on the display unit 25 that the user desires, and selects an element displayed on the display unit 25.

An icon 310 is further displayed on the display unit 25. The icon 310 is displayed on the work space 400.

In the present exemplary embodiment, a file icon 310*a* corresponding to a file is displayed as an icon. While only one file icon 310*a* is displayed in the present exemplary embodiment, a plurality of file icons 310*a* are displayed in the case where there are a plurality of files.

The file icon 310*a* as an example of a file image is an image that corresponds to and represents a file. A picture, a symbol, text information, etc. is displayed as the file icon 310*a*.

In the case where the file icon 310*a* corresponds to a file for image data, an image obtained by reducing an image represented by the image data is displayed as the file icon 310*a*, for example.

Meanwhile, in the case where the file icon 310*a* corresponds to a file for a document with a plurality of pages, for example, an image obtained by reducing an image of a representative page such as a first page is displayed as the file icon 310*a*, for example.

The file icon 310*a* functions as an icon for opening the corresponding file.

A tray icon 310*b* corresponding to a tray that accommodates files is displayed in the work space 400. In the present exemplary embodiment, the user selects the tray icon 310*b* to select the tray.

Besides, a folder icon corresponding to a folder and a private mail box icon corresponding to a private mail box are occasionally displayed in the work space 400, although not illustrated.

The folder icon is an icon corresponding to a folder that accommodates files. The user selects the folder icon to select the folder.

The private mail box icon is an icon provided for each user that operates the terminal apparatus 20. In the present exemplary embodiment, a file provided from a third party to the user that operates the terminal apparatus 20 is stored in an information storage region corresponding to the private mail box icon.

The user selects the private mail box icon to reference the file stored in the information storage region.

In the present exemplary embodiment, as illustrated in FIG. 4A, a switch button 26 that is used to switch a display mode is displayed on the display unit 25.

In the present exemplary embodiment, an operation by the user is performed on the switch button 26. Specifically, the user performs an operation on the switch button 26 to turn on and off the switch button 26.

In the present exemplary embodiment, an enlarged image is displayed as discussed later when the user moves the pointer image 200 onto the file icon 310a in a state in which the switch button 26 is turned on (see FIG. 4B) (hereinafter referred to as an "ON state").

In the present exemplary embodiment, in the ON state, the display mode is a display mode in which an enlarged image is displayed. In the ON state, an enlarged image is displayed when the user performs a specific operation on the file icon 310a (see FIG. 4A).

Examples of the specific operation include an operation to select the file icon 310a by moving the pointer image 200 onto the file icon 310a.

In the present exemplary embodiment, in the ON state, an enlarged image is displayed when the user selects the file icon 310a by moving the pointer image 200 onto the file icon 310a.

In the present exemplary embodiment, a mouse click is not required to select the file icon 310a, and the file icon 310a is selected and an enlarged image is displayed by just moving the pointer image 200 onto the file icon 310a.

In the ON state, an enlarged image is displayed on the display unit 25 when the user performs a specific operation in this manner.

In the present exemplary embodiment, on the other hand, an enlarged image is not displayed, even if the user selects the file icon 310a by moving the pointer image 200 onto the file icon 310a, in a state in which the switch button 26 is turned off (see FIG. 4B) (hereinafter referred to as an "OFF state").

Figure 5:
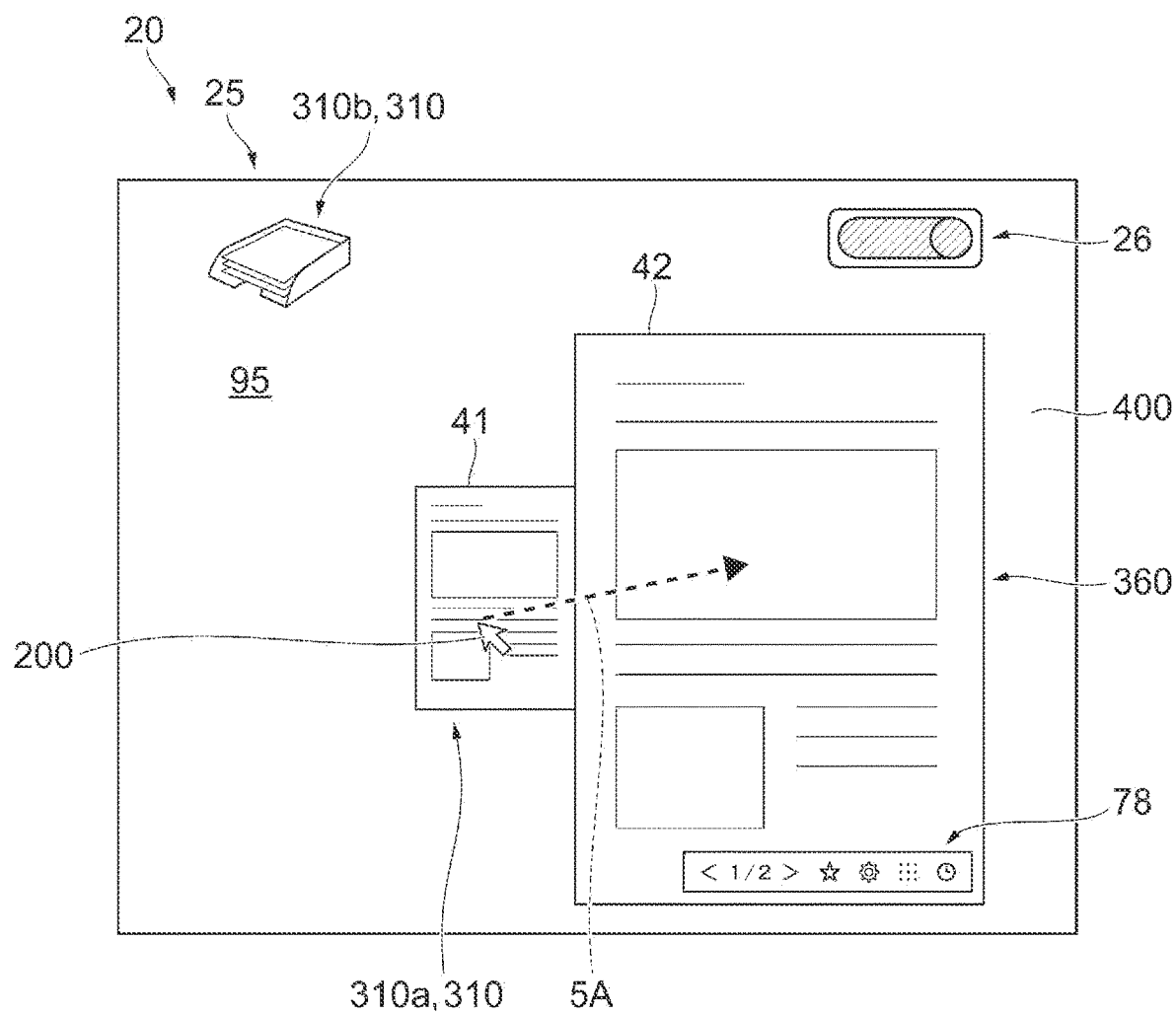
FIG. 5 illustrates the state of the display unit for a case where a file icon is selected by a user.

FIG. 5 illustrates the state of the display unit 25 for a case where the file icon 310a is selected by the user. In other words, FIG. 5 illustrates the state of the display unit 25 for the case where the user has moved the pointer image 200 onto the file icon 310a in the ON state described above.

The CPU 11a (see FIG. 2) of the server device 10 as an example of a processor allows an enlarged image 360 to be displayed on the display unit 25, as illustrated in FIG. 5, in the case where the pointer image 200 is moved onto the file icon 310a.

The enlarged image 360 is an image corresponding to the file icon 310a and that is larger in display size than the file icon 310a.

Movement of the pointer image 200 onto the file icon 310a may be taken as the user selecting the file icon 310a.

In the present exemplary embodiment, in the case where the file icon 310a is selected by the user, the enlarged image 360 corresponding to the file icon 310a is displayed on the display unit 25 as illustrated in FIG. 5.

In the present exemplary embodiment, display of the enlarged image 360 is maintained while the pointer image 200 is located on the file icon 310a.

In the present exemplary embodiment, the shape of the file icon 310a is similar to the shape of the enlarged image 360. In the present exemplary embodiment, in addition, the enlarged image 360 is an image obtained by simply enlarging the file icon 310a.

Such a mode of display is not limiting, and the enlarged image 360 may display a content that is different from the display content of the file icon 310a. The shape of the enlarged image 360 and the shape of the file icon 310a may not be similar to each other.

In the present exemplary embodiment, the "enlarged image 360" refers to an image that is larger in display size than the file icon 310a. The display content and the shape of the enlarged image 360 do not affect the determination as to whether or not the enlarged image 360 corresponds to the file icon 310a.

The enlarged image 360 corresponds to the file icon 310a if the display area of the enlarged image 360 is larger than the display area of the file icon 310a, even if the file icon 310a and the enlarged image 360 are different from each other in the display content or different from each other in the shape.

Being "large in display size" is synonymous with being large in display area.

As illustrated in FIG. 5, the enlarged image 360 is displayed around the file icon 310a based on which the enlarged image 360 is displayed. The enlarged image 360 is displayed at a location adjacent to the file icon 310a.

The enlarged image 360 may be displayed on one of the right and left sides of the file icon 310a on which a larger space is positioned.

The display position of the enlarged image 360 is not limited to one of the right and left sides of the file icon 310a, and may be one of the upper and lower sides of the file icon 310a.

In the case where the enlarged image 360 is displayed on one of the upper and lower sides of the file icon 310a, the enlarged image 360 may be displayed on one of the upper and lower sides of the file icon 310 on which a larger space is positioned, similarly to the above.

Figure 6:
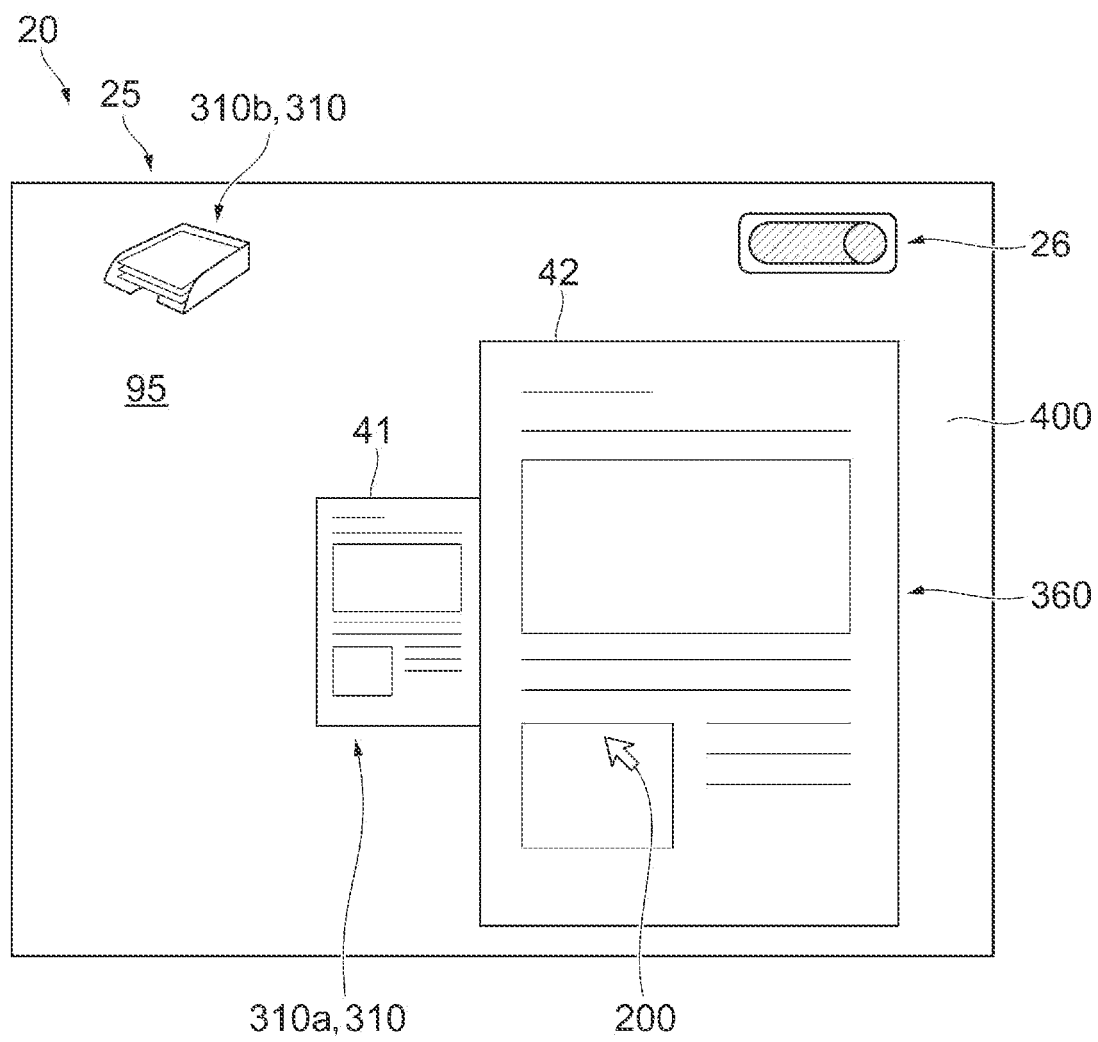
FIG. 6 illustrates the state of the display unit after a pointer image that has been located on the file icon is moved onto an enlarged image.

FIG. 6 illustrates the state of the display unit 25 after the pointer image 200 that has been located on the file icon 310a is moved onto the enlarged image 25.

In the present exemplary embodiment, the CPU 11a of the server device 10 maintains display of the enlarged image 360 also in the case where the pointer image 200 is moved to the enlarged image 360 and the pointer image 200 is placed on the enlarged image 360. That is, the CPU 11a of the server device 10 maintains display of the enlarged image 360 also in the case where the pointer image 200 is moved to the enlarged image 360 away from the file icon 310a.

The CPU 11a of the server device 10 maintains display of the enlarged image 360 while the pointer image 200 that has been moved from the file icon 310a to the enlarged image 360 is located on the enlarged image 360.

Figure 7:
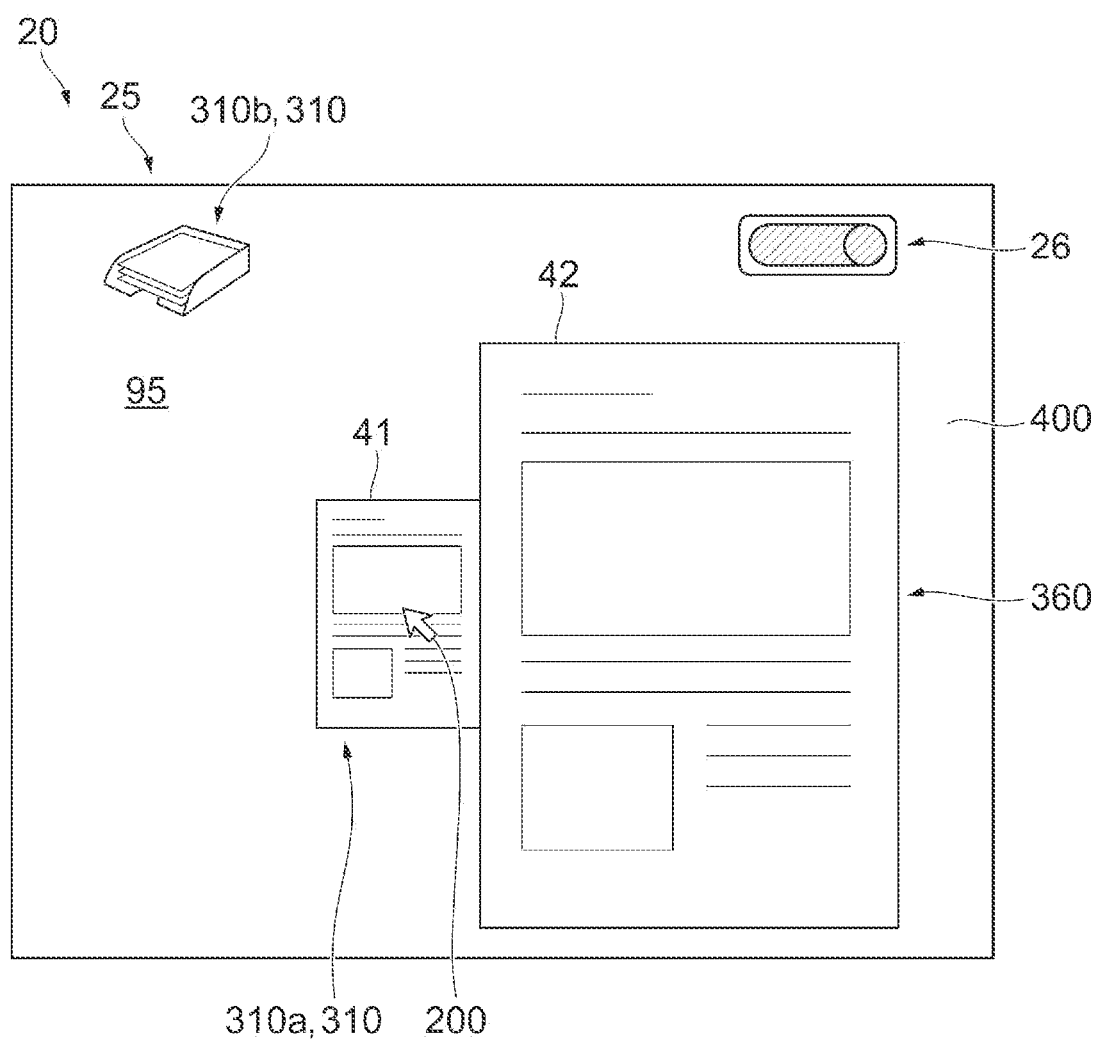
FIG. 7 illustrates another example of display on the display unit.

In the present exemplary embodiment, in addition, the CPU 11a of the server device 10 maintains display of the enlarged image 360 also in the case where the pointer image 200 located on the enlarged image 360 is returned onto the file icon 310a as illustrated in FIG. 7 (which illustrates another example of display on the display unit 25).

Further, the CPU 11a of the server device 10 maintains display of the enlarged image 360 also in the case where the pointer image 200 that has been returned onto the file icon 310a is continuously positioned on the file icon 310a.

The CPU 11a of the server device 10 maintains display of the enlarged image 360 while the pointer image 200 that has been returned onto the file icon 310a is located on the file icon 310a.

Besides, the CPU 11a of the server device 10 may hide the enlarged image 360 in the case where the pointer image 200 which has been placed on the enlarged image 360 is moved onto the file icon 310a.

That is, the CPU 11a of the server device 10 may erase the enlarged image 360 using movement of the pointer image 200 which has been placed on the enlarged image 360 away from the enlarged image 360 as an impetus.

In the present exemplary embodiment, in addition, the enlarged image 360 is hidden in the case where the pointer image 200 is moved to a location in the work space 400 (see FIG. 5) other than the display location at which the enlarged image 360 and the file icon 310a are displayed.

In other words, in the present exemplary embodiment, the enlarged image 360 is hidden using movement of the pointer image 200 away from the enlarged image 360 or the file icon 310a in the work space 400 as an impetus.

Hereinafter, the location in the work space 400 other than the display location at which the enlarged image 360 and the file icon 310a are displayed will be referred to as a "non-display location 95".

In the present exemplary embodiment, the CPU 11a of the server device 10 displays the enlarged image 360 with no gap formed between the file icon 310a and the enlarged image 360 as illustrated in FIG. 5.

Consequently, in the present exemplary embodiment, the pointer image 200 is not positioned in the non-display location 95 and display of the enlarged image 360 is maintained even in the case where the pointer image 200 is moved between the file icon 310a and the enlarged image 360.

In the present exemplary embodiment, the enlarged image 360 is displayed with an outer peripheral edge 41 of the file icon 310a and an outer peripheral edge 42 of the enlarged image 360 contacting each other. Consequently, no gap is formed between the file icon 310a and the enlarged image 360 as described above.

Figure 8:
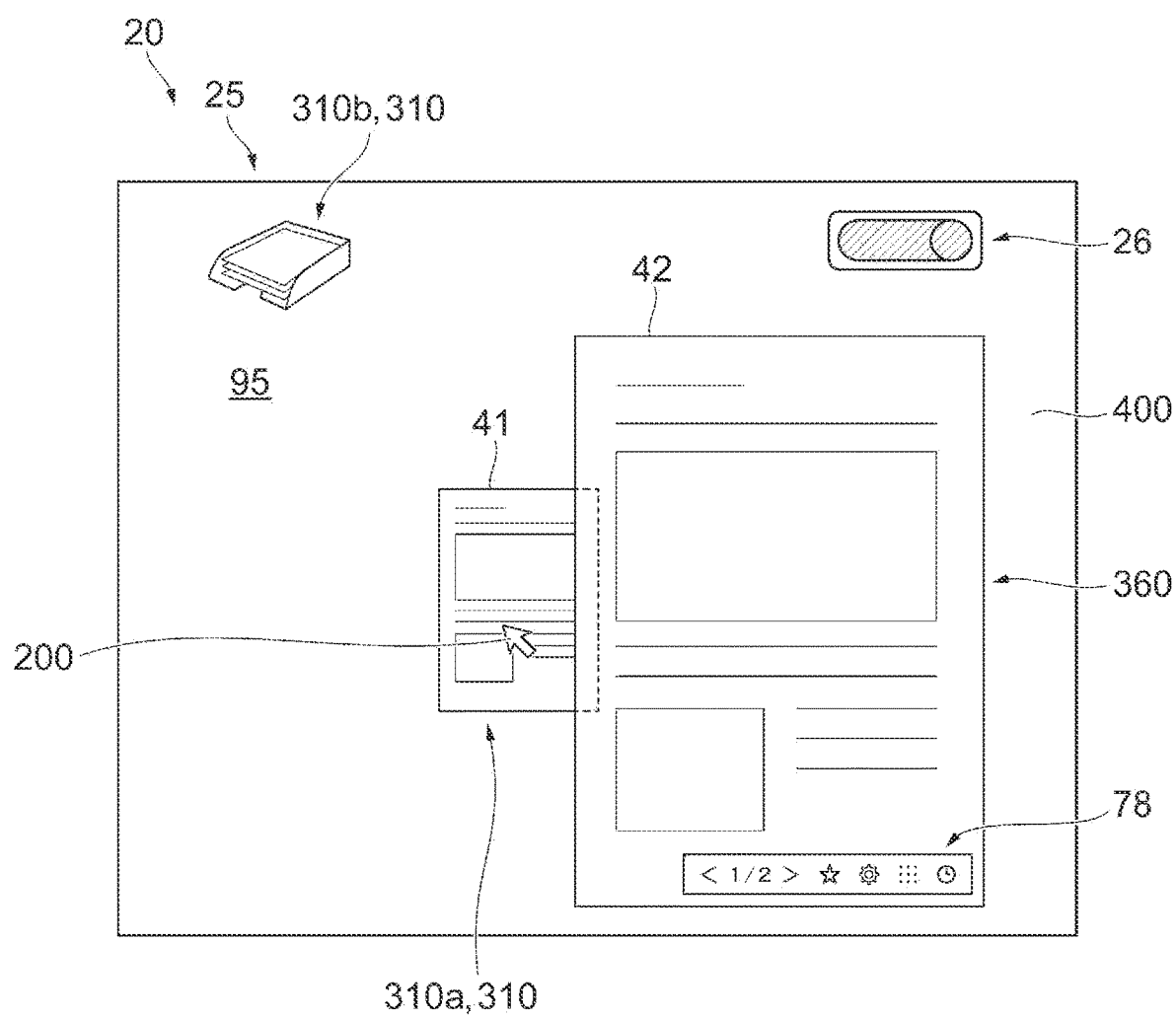
FIG. 8 illustrates another example of display on the display unit.

The mode of display on the display unit 25 is not limited thereto, and the file icon 310a and the enlarged image 360 may be displayed with a part of the file icon 310a and a part of the enlarged image 360 overlapping each other as illustrated in FIG. 8 (which illustrates another example of display on the display unit 25).

Also in this case, no gap is formed between the file icon 310a and the enlarged image 360, and display of the enlarged image 360 is maintained by moving the pointer image 200 such that the pointer image 200 passes through a location at which the file icon 310a and the enlarged image 360 overlap each other.

In the present exemplary embodiment, further, the CPU 11a of the server device 10 displays, on the display unit 25, reception display 78 for receiving an operation by the user for the enlarged image 360 being displayed, as illustrated in FIG. 5. In the display example illustrated in FIG. 5, the reception display 78 is displayed within the display region of the enlarged image 360.

Further, the CPU 11a of the server device 10 maintains display of the enlarged image 360 also in the case where the pointer image 200 is placed on the reception display 78.

More specifically, the CPU 11a of the server device 10 maintains display of the enlarged image 360 also in the case where the pointer image 200 which has been moved from the file icon 310a to the enlarged image 360 is placed on the reception display 78.

A plurality of select items to be selected by the user to receive an instruction from the user are displayed in the reception display 78. In other words, a plurality of menu buttons are displayed in the reception display 78.

In the present exemplary embodiment, a select item for receiving an instruction to change the page being displayed, a select item for receiving an instruction to edit the file, a select item for receiving an instruction to display a tag image or a stamp image, and a select item for receiving an instruction to transmit the file to another user, for example, are displayed as the select items.

The reception display 78 may not be displayed in the case where the pointer image 200 is located on the file icon 310a, and may be displayed in the case where the pointer image 200 is located on the enlarged image 360.

In other words, the reception display 78 may not be displayed in the case where the pointer image 200 is located on the file icon 310a, and may be displayed using movement of the pointer image 200 onto the enlarged image 360 as an impetus.

The reception display 78 may be rendered highly transmissive to be translucent to allow a portion of the enlarged image 360 overlapping the reception image 78 to be displayed as seeable through the reception display 78.

The manner of display of the reception display 78 may be different between the case where the pointer image 200 is not positioned on the reception display 78 and the case where the pointer image 200 is positioned on the reception display 78.

Specifically, the reception display 78 is rendered highly transmissive to be translucent in the case where the pointer image 200 is not positioned on the reception display 78, for example. In the case where the pointer image 200 is positioned on the reception display 78, on the other hand, the reception display 78 is rendered less transmissive to be seeable more clearly than in the case where the pointer image 200 is not positioned on the reception display 78.

Figure 9:
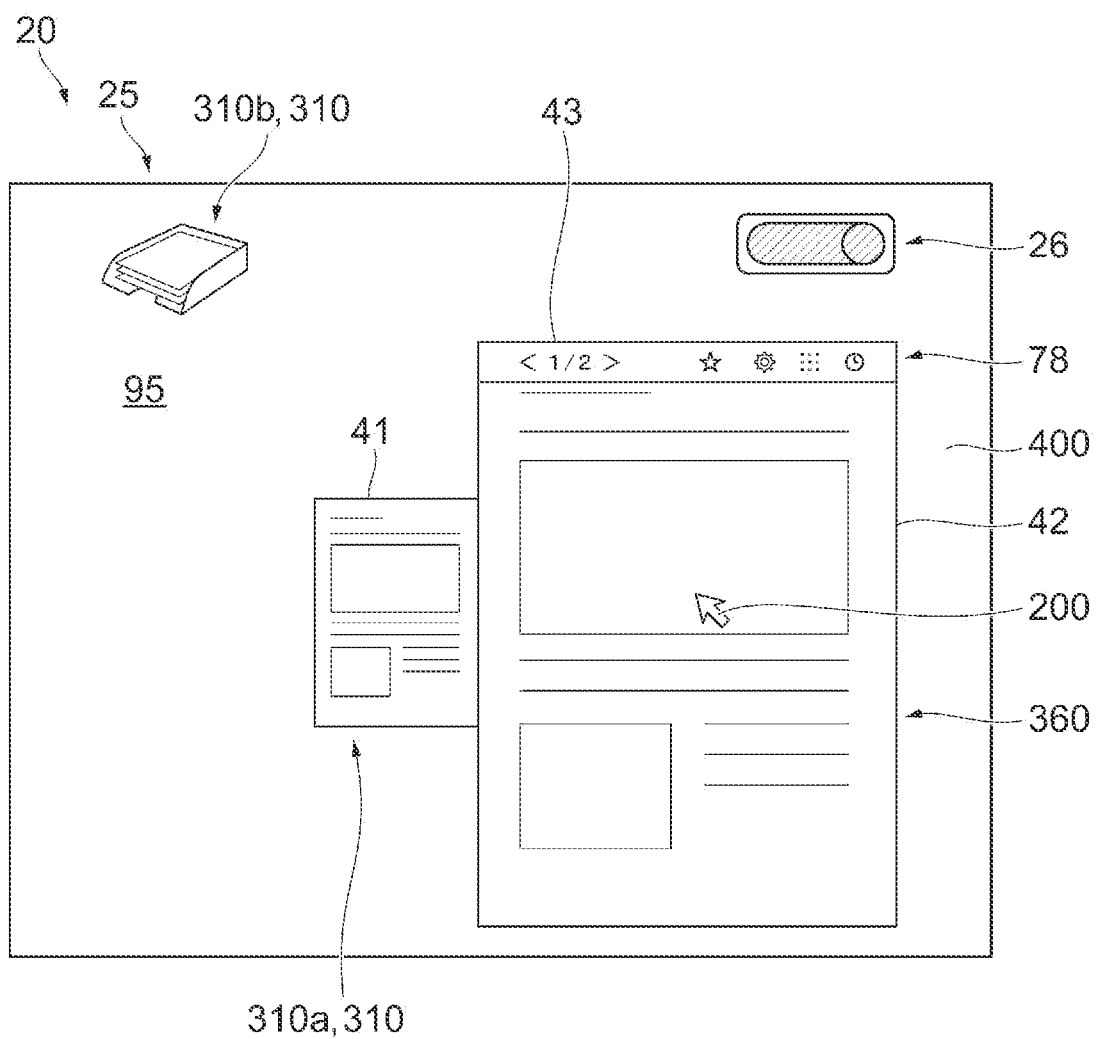
FIG. 9 illustrates another example of display on the display unit.

FIG. 9 illustrates another example of display on the display unit 25.

The reception display 78 is not limited to being displayed within the display region of the enlarged image 360, and may be displayed at a location off the display region of the enlarged image 360 as illustrated in FIG. 9.

Display of the enlarged image 360 may be maintained in the case where the pointer image 200 is placed on the reception display 78 displayed at a location off the display region of the enlarged image 360.

The pointer image 200 is located off the enlarged image 360 in the case where the pointer image 200 is placed on the reception display 78 positioned at a location off the display region of the enlarged image 360.

In the example illustrated in FIG. 9, the reception display 78 is positioned at the non-display location 95, and the pointer image 200 is positioned at the non-display location 95 in the case where the pointer image 200 is placed on the reception display 78.

In the present exemplary embodiment, in this manner, display of the enlarged image 360 is maintained in the case where the pointer image 200 is positioned on the reception display 78, even when the pointer image 200 is located off the enlarged image 360 and the pointer image 200 is positioned at the non-display location 95.

This allows the user to perform an operation on the reception display 78 while referencing the enlarged image 360.

In the display example illustrated in FIG. 9, the reception display 78 is displayed with the outer peripheral edge 42 of the enlarged image 360 and an outer peripheral edge 43 of the reception display 78 contacting each other, and no gap is formed between the enlarged image 360 and the reception display 78.

In this case, the pointer image 200 does not pass through a gap when the pointer image 200 is moved from the enlarged image 360 to the reception display 78, and a situation in which the enlarged image 360 is hidden is not caused.

The outer peripheral edge 42 of the enlarged image 360 and the outer peripheral edge 43 of the reception display 78 contacting each other is not limiting, and the reception display 78 may be displayed with a part of the enlarged image 360 and a part of the reception display 78 overlapping each other. No gap is formed also in this case.

Figure 10:
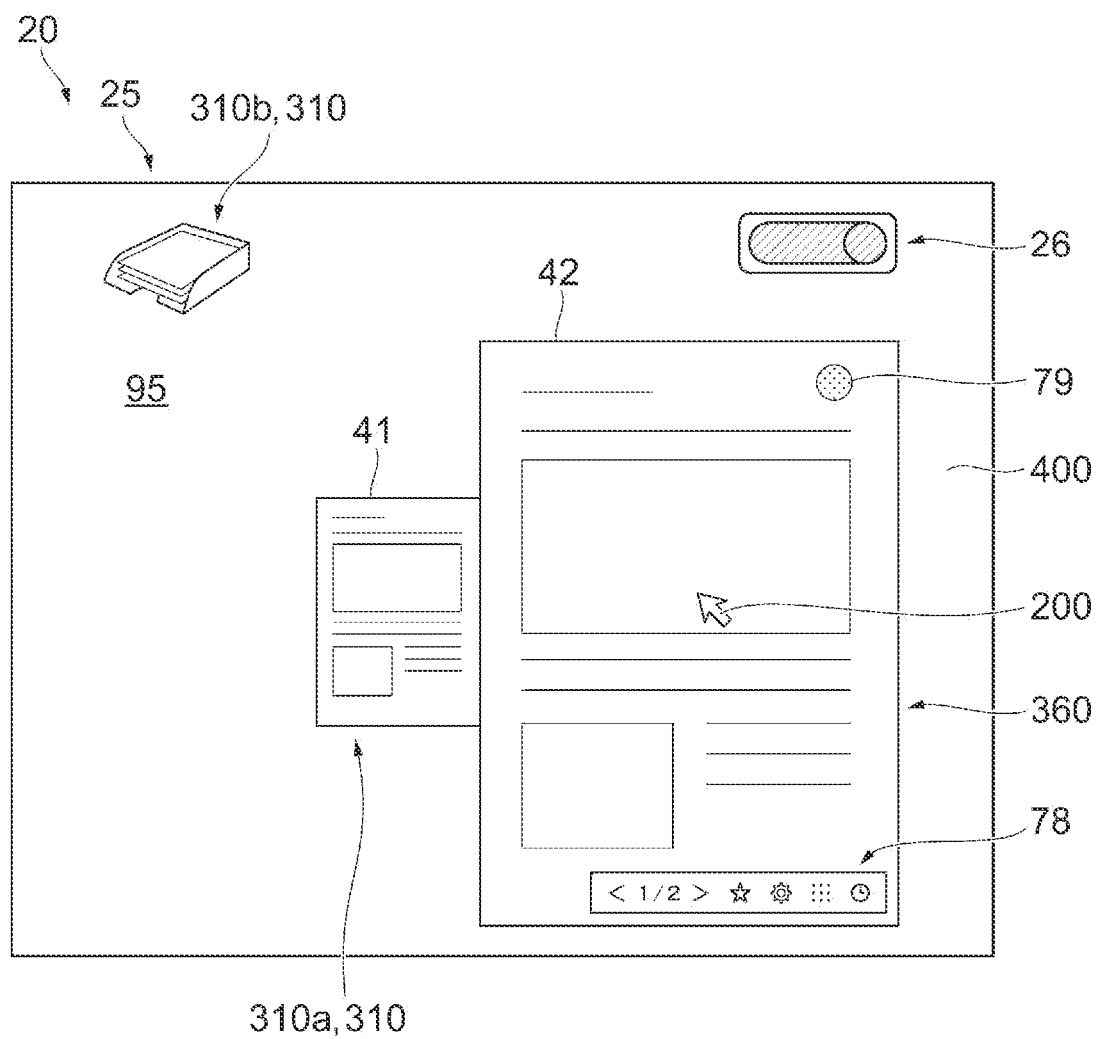
FIG. 10 illustrates another example of display on the display unit.

FIG. 10 illustrates another example of display on the display unit 25.

In the display example, a reception image 79 for receiving an instruction to maintain display of the enlarged image 360 from the user is displayed on the enlarged image 360.

In the display example, the CPU 11*a* of the server device 10 maintains display of the enlarged image 360, even if the pointer image 200 is moved off the enlarged image 360, in the case where the user clicks the reception image 79.

More specifically, the CPU 11*a* of the server device 10 maintains display of the enlarged image 360, even if the pointer image 200 is moved to the non-display location 95, in the case where the user clicks the reception image 79.

In the display example, display of the enlarged image 360 is maintained after the user performs an operation determined in advance with the enlarged image 360 displayed.

Specifically, in the present exemplary embodiment, examples of the operation determined in advance include clicking the reception image 79 as described above, and display of the enlarged image 360 is maintained in the case where the reception image 79 is clicked.

In the display example, the mode in which display of the enlarged image 360 is maintained is canceled when the reception image 79 is clicked the second time.

There are other examples of the operation determined in advance than clicking the reception image 79, and other examples of the operation determined in advance include double-clicking the enlarged image 360.

In the case where the mode in which display of the enlarged image 360 is maintained is entered by double-clicking the enlarged image 360, the user may cancel the mode by double-clicking the enlarged image 360 again, for example. Consequently, the mode in which display of the enlarged image 360 is maintained is canceled.

Figure 11:
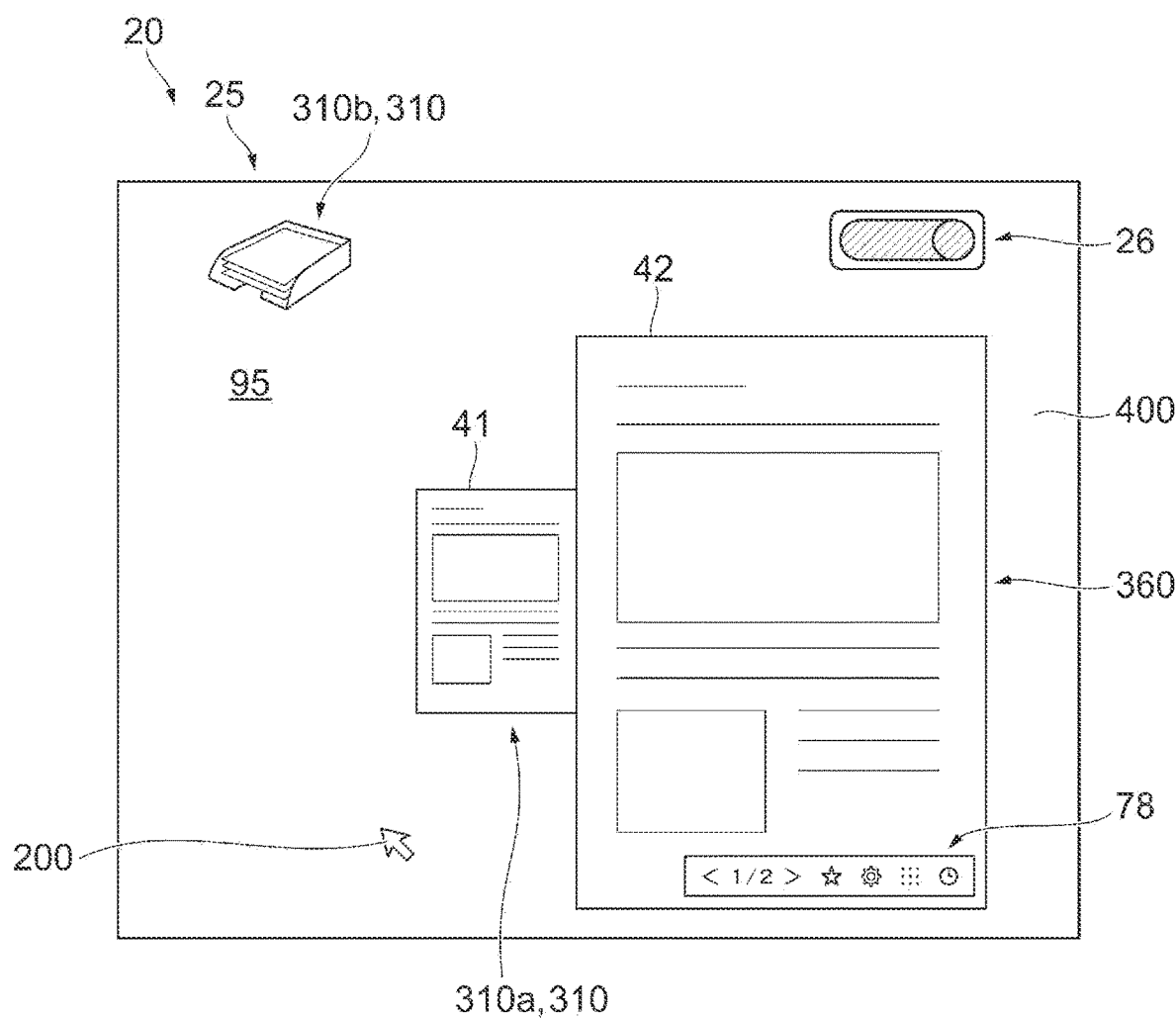
FIG. 11 illustrates another example of display on the display unit.

Besides, the CPU 11*a* of the server device 10 may maintain display of the enlarged image 360 in the case where the time for which the pointer image 200 is located off the enlarged image 360 is less than a threshold determined in advance, even in the case where the pointer image 200 is located off the enlarged image 360 being displayed, as illustrated in FIG. 11 (which illustrates another display example of display on the display unit 25).

In other words, the CPU 11*a* of the server device 10 maintains display of the enlarged image 360, rather than erasing the enlarged image 360, until a time specified by the above threshold determined in advance elapses, even in the case where the pointer image 200 that has been located on the enlarged image 360 is moved to the non-display location 95.

Then, the CPU 11*a* of the server device 10 maintains display of the enlarged image 360, as it is, in the case where the pointer image 200 is returned onto the enlarged image 360 or the file icon 310*a* before the specified time elapses.

On the other hand, the CPU 11*a* of the server device 10 erases the enlarged image 360 in the case where the pointer image 200 is not located in the display region of the file icon 310*a* or the display region of the enlarged image 360 when the time specified by the threshold has elapsed.

In other words, the CPU 11*a* of the server device 10 erases the enlarged image 360 in the case where the pointer image 200 is located at the non-display location 95 when the time specified by the threshold has elapsed.

Besides, a process of erasing the enlarged image 360 may be performed in the case where the pointer image 200 is located on the file icon 310*a*, rather than being located on the enlarged image 360, when the time specified by the threshold has elapsed.

Figure 12:
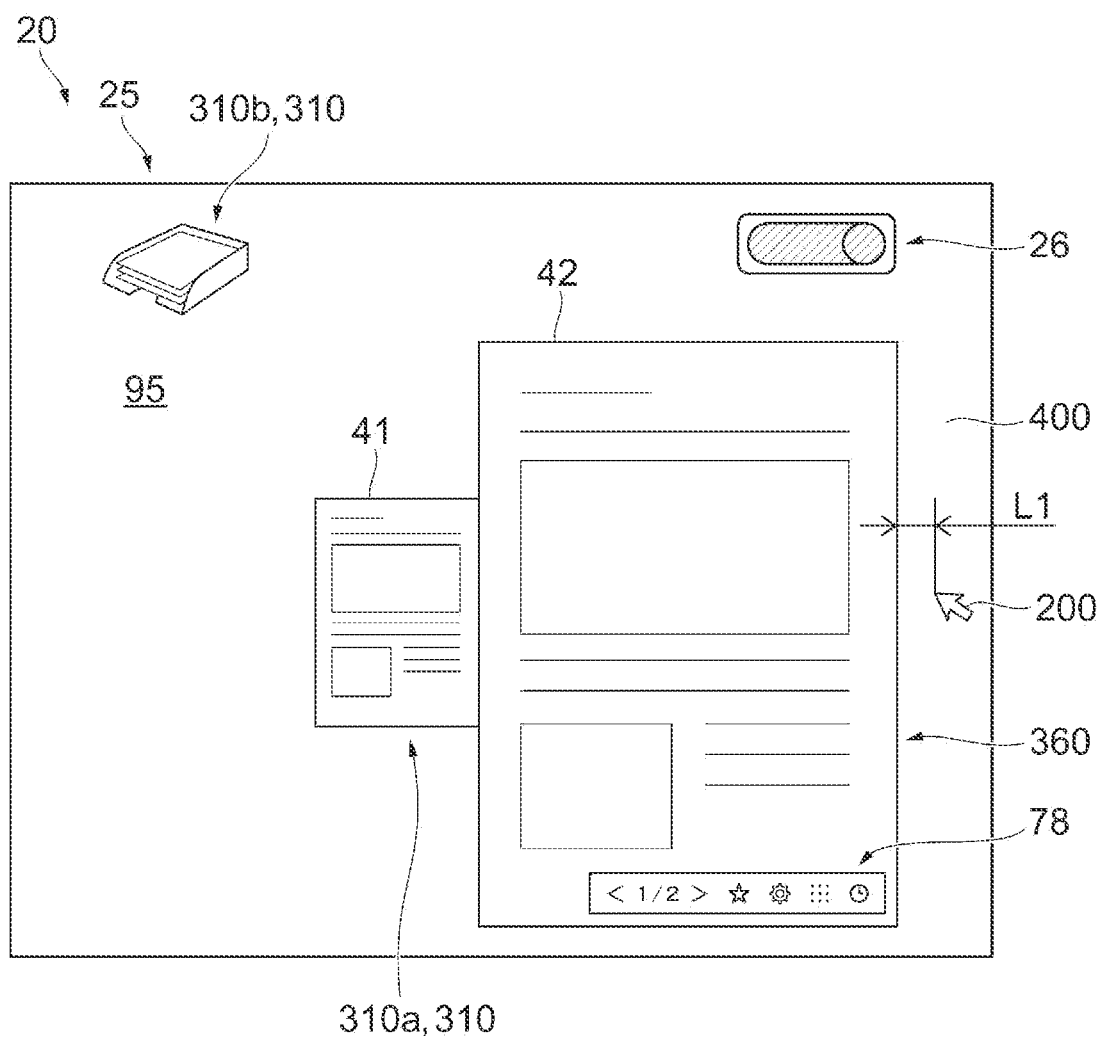
FIG. 12 illustrates another example of display on the display unit.

Besides, the CPU 11*a* of the server device 10 may maintain display of the enlarged image 360 in the case where a separation distance L1 between the outer peripheral edge 42 of the enlarged image 360 and the pointer image 200 is less than a threshold determined in advance, as illustrated in FIG. 12 (which illustrates another example of display on the display unit 25), even in the case where the pointer image 200 is located off the enlarged image 360 being displayed.

In other words, the CPU 11*a* of the server device 10 may maintain display of the enlarged image 360 in the case where the separation distance L1 between the outer peripheral edge 42 of the enlarged image 360 and the pointer image 200 is less than the threshold determined in advance, even if the pointer image 200 that has been located on the enlarged image 360 is moved to the non-display location 95.

In this case, display of the enlarged image 360 is maintained in a situation in which the pointer image 200 is located within a specific region positioned around the enlarged image 360 and surrounding the enlarged image 360.

Figure 13:
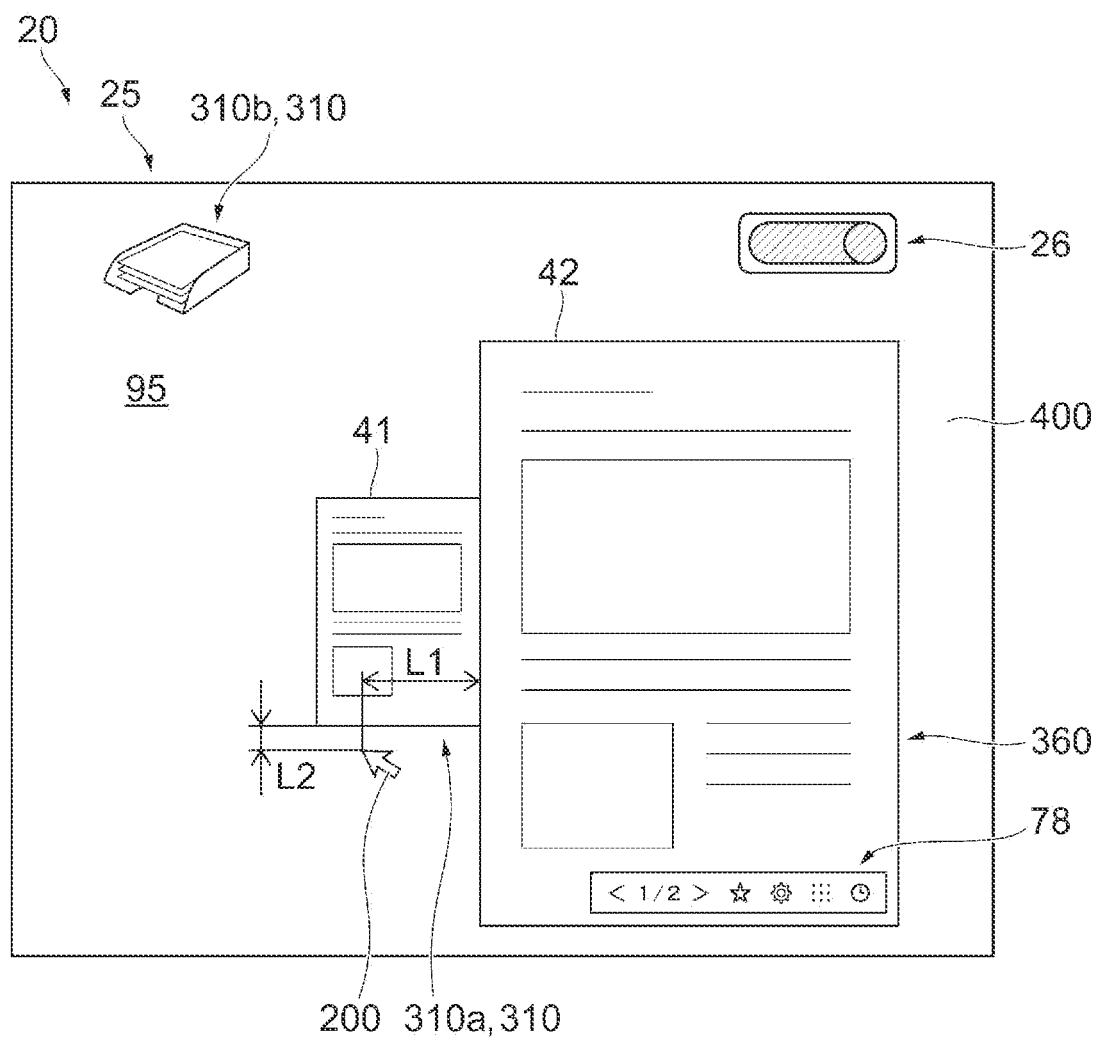
FIG. 13 illustrates another example of display on the display unit.

Besides, display of the enlarged image 360 may be maintained in the case where a separation distance L2 between the outer peripheral edge 41 of the file icon 310*a* and the pointer image 200 is less than a threshold determined in advance, even in the case where the separation distance L1 between the outer peripheral edge 42 of the enlarged image 360 and the pointer image 200 positioned at the non-display location 95 is more than the above threshold determined in advance, as illustrated in FIG. 13 (which illustrates another example of display on the display unit 25).

In the present exemplary embodiment, there may be a case where the pointer image 200 is positioned close to the file icon 310*a*, even in the case where the pointer image 200 positioned at the non-display location 95 is located away from the enlarged image 360, as illustrated in FIG. 13.

In this case, display of the enlarged image 360 may be maintained in the case where the separation distance L2 between the outer peripheral edge 41 of the file icon 310*a* and the pointer image 200 is less than a threshold determined in advance.

In the processes described with reference to FIGS. 12 and 13, display of the enlarged image 360 is maintained if at least one of the separation distance L1 between the outer peripheral edge 42 of the enlarged image 360 and the pointer image 200 and the separation distance L2 between the outer peripheral edge 41 of the file icon 310*a* and the pointer image 200 is less than a threshold determined in advance.

The phrase "separation distance between the outer peripheral edge and the pointer image 200" refers to the separation distance between a portion of the outer peripheral edge that is closest to the pointer image 200 and the pointer image 200.

Besides, the CPU 11a of the server device 10 may move the pointer image 200 on the file icon 310a onto the enlarged image 360, as indicated by symbol 5A in FIG. 5, in the case where the enlarged image 360 is displayed.

In the present exemplary embodiment, as described above, the CPU 11a of the server device 10 displays the enlarged image 360 on the display unit 25 in the case where the pointer image 200 is placed on the file icon 310a and the file icon 310a is selected using the pointer image 200.

In this event, the CPU 11a of the server device 10 may move the pointer image 200 located on the file icon 310a onto the enlarged image 360. In other words, in this case, the CPU 11a of the server device 10 may display the pointer image 200 at a position on the enlarged image 360 by moving the pointer image 200 on the file icon 310a onto the enlarged image 360.

This allows the user to perform an operation on the pointer image 200 located on the enlarged image 360 without performing an operation to move the pointer image 200 to the enlarged image 360.

Besides, in the case where the enlarged image 360 is displayed, the CPU 11a of the server device 10 may maintain display of the enlarged image 360 until the pointer image 200 on the file icon 310a is moved onto the enlarged image 360.

Figure 14:
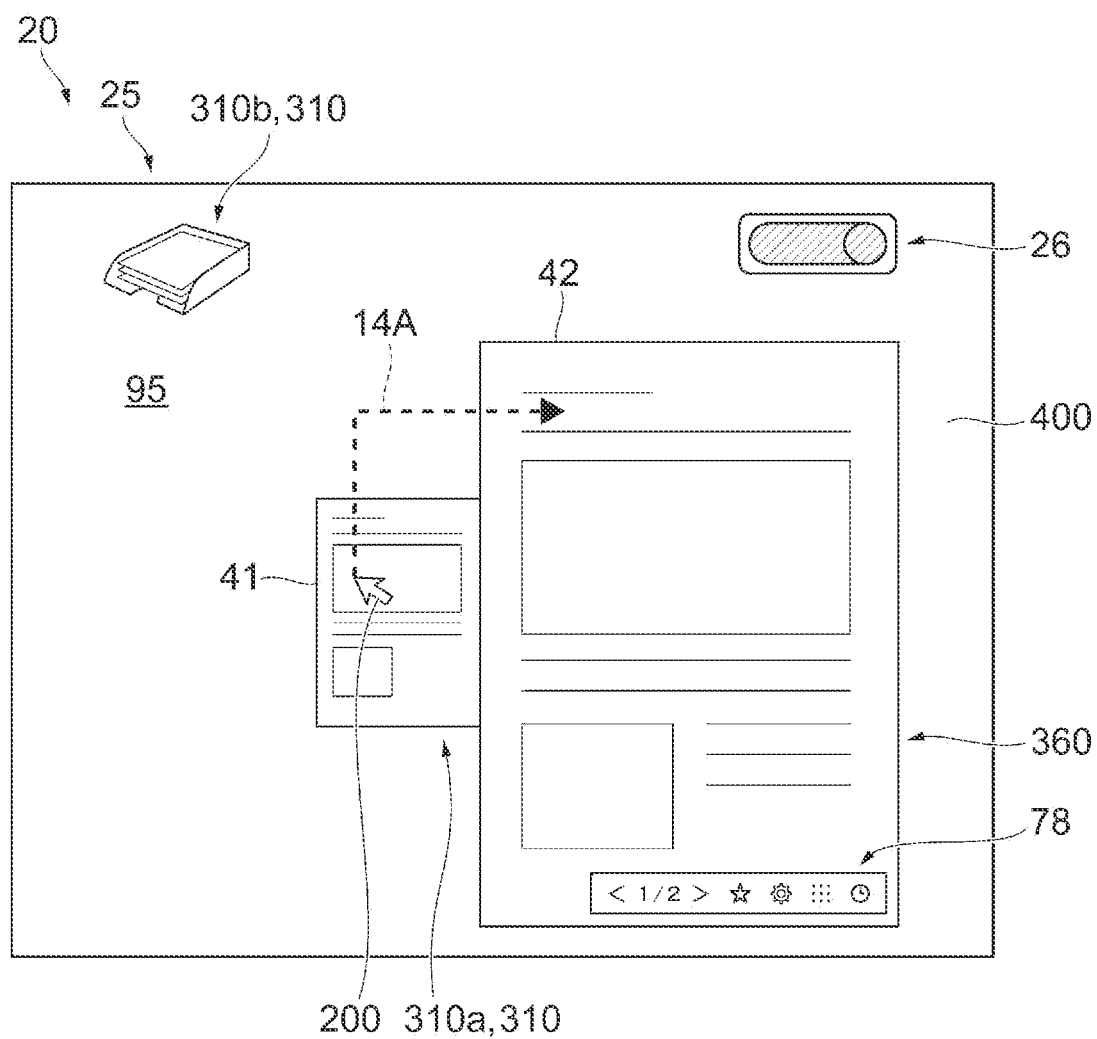
FIG. 14 illustrates an example of motion of the pointer image.

In other words, in this case, the CPU 11a of the server device 10 maintains display of the enlarged image 360, even if the pointer image 200 is temporarily moved to the non-display location 95 as indicated by symbol 14A in FIG. 14 (which illustrates an example of motion of the pointer image), until the pointer image 200 on the file icon 310a is moved onto the enlarged image 360.

In other words, the CPU 11a of the server device 10 maintains display of the enlarged image 360, rather than erasing the enlarged image 360, even in the case where the pointer image 200 on the file icon 310a is moved to the enlarged image 360 through the non-display location 95 through an operation by the user.

Consequently, display of the enlarged image 360 is maintained, rather than the enlarged image 360 is erased, even in the case where the pointer image 200 which is moved through an operation by the user is moved toward the enlarged image 360 through the non-display location 95.

After the pointer image 200 is moved onto the enlarged image 360, the pointer image 200 is positioned on the enlarged image 360 as described above, and therefore display of the enlarged image 360 is maintained continuously.

The enlarged image 360 may be erased, rather than display of the enlarged image 360 is maintained, in the case where the pointer image 200 on the file icon 310a is moved to the enlarged image 360 through the non-display location 95 and this movement is the second or subsequent movement from the file icon 310a to the enlarged image 360.

In the case where the pointer image 200 on the file icon 310a is moved to the non-display location 95 and through the non-display location 95, this movement is assumed to be movement for erasing the enlarged image 360, rather than movement for moving the pointer image 200 toward the enlarged image 360.

It is assumed that the user who desires to erase the enlarged image 360 dares to move the pointer image 200 to the non-display location 95. In the case where the pointer image 200 is moved through the non-display location 95, this movement is occasionally movement for erasing the enlarged image 360.

Thus, the enlarged image 360 may be erased, rather than display of the enlarged image 360 is maintained, as described above in the case where the pointer image 200 is moved through the non-display location 95 for a specific number-th time such as the second time.

In the example described above, the enlarged image 360 is displayed in the case where the user selects the file icon 310a as an example of a specific operation in the ON state.

However, the condition for displaying the enlarged image 360 is not limited thereto, and the enlarged image 360 may be displayed in the case where a different condition is met.

For example, the enlarged image 360 may be displayed on the display unit 25 in the case where the user performs a specific operation (hereinafter referred to as a "first specific operation") when the user is performing an operation determined in advance, even in the OFF state.

Specifically, the enlarged image 360 may be displayed in the case where the user selects the file icon 310a by moving the pointer image 200 onto the file icon 310a while the user is pressing a Ctrl key or an Alt key provided on the keyboard in the OFF state, for example.

In other words, the enlarged image 360 may be displayed in the case where the user performs the first specific operation, by selecting the file icon 310a, while the user is pressing the Ctrl key or the Alt key provided on the keyboard.

Besides, the switch button 26 may not be displayed, and the enlarged image 360 may be displayed simply when the pointer image 200 is moved onto the file icon 310a to select the file icon 310a.

Besides, the switch button 26 may not be displayed, and the enlarged image 360 may be displayed in the case where the user selects the file icon 310a by moving the pointer image 200 onto the file icon 310a while the user is pressing the Ctrl key or the Alt key provided on the keyboard.

In other words, the enlarged image 360 may be displayed on the display unit 25 in the case where the user moves the pointer image 200 onto the file icon 310a when the user is pressing a specific key as an example of a specific operation (hereinafter referred to as a "second specific operation") determined in advance.

Display of the enlarged image 360 may be maintained in the case where the pointer image 200 is placed on the enlarged image 360 being displayed, even when the user is not performing the second specific operation any more.

More specifically, the CPU 11a of the server device 10 may maintain display of the enlarged image 360 in the case where the pointer image 200 is placed on the enlarged image 360 being displayed, when the user is not pressing the specific key any more.

Besides, the CPU 11a of the server device 10 may maintain display of the enlarged image 360 in the case where the pointer image 200 is placed on either of the file icon 310a and the enlarged image 360 when the user is not performing the second specific operation any more.

On the other hand, the CPU 11a of the server device 10 hides the enlarged image 360 in the case where the pointer image 200 is positioned at the non-display location 95 when the second specific operation is not performed any more.

Figure 15:
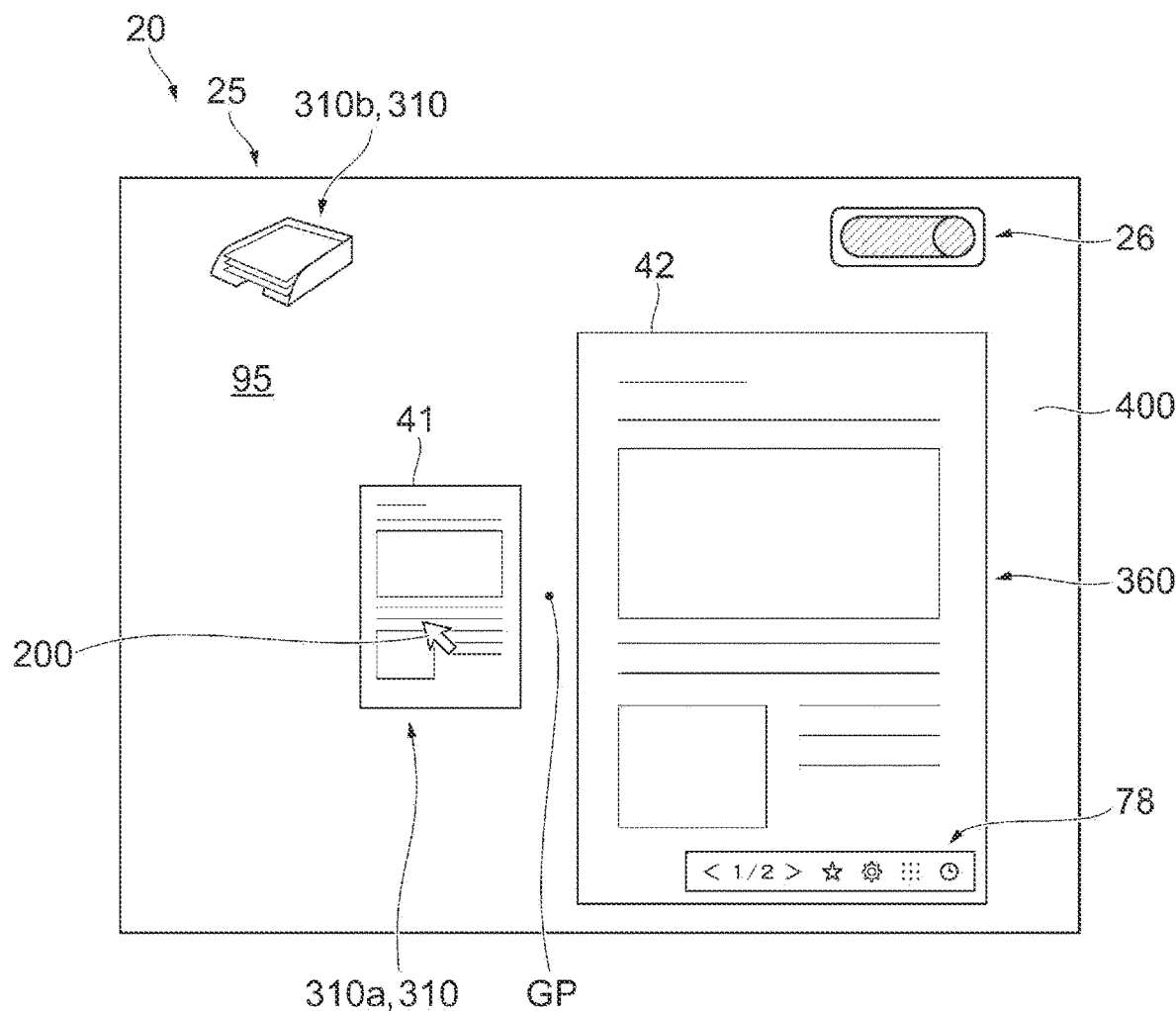
FIG. 15 illustrates another example of display on the display unit.

FIG. 15 illustrates another example of display on the display unit 25.

In the display example, the file icon 310a and the enlarged image 360 are displayed with a gap GP positioned between the file icon 310a and the enlarged image 360.

While the enlarged image 360 is displayed with the outer peripheral edge 41 of the file icon 310a and the outer peripheral edge 42 of the enlarged image 360 contacting each other in the example described above, the enlarged image 360 may be displayed as spaced away from the file icon 310a as illustrated in FIG. 15. In this case, as illustrated in FIG. 15, the gap GP is formed between the file icon 310a and the enlarged image 360.

In this case, the CPU 11a of the server device 10 maintains display of the enlarged image 360 also in the case where the pointer image 200 is positioned in the gap GP which is present between the file icon 310a and the enlarged image 360.

Consequently, the enlarged image 360 is not hidden when the pointer image 200 is moved from the file icon 310a to the enlarged image 360, and the enlarged image 360 is not hidden when the pointer image 200 is moved from the enlarged image 360 to the file icon 310a.

The reception display 78 (see FIG. 9) described above may also be displayed with a gap GP formed between the enlarged image 360 and the reception display 78.

In this case, further, display of the reception display 78 may be maintained when the pointer image 200 is located in the gap GP between the enlarged image 360 and the reception display 78.

Consequently, in this case, display of the reception display 78 is maintained both in the case where the pointer image 200 is moved from the enlarged image 360 to the reception display 78 and in the case where the pointer image 200 is moved from the reception display 78 to the enlarged image 360.

Next, erasure of the enlarged image 360 will be described.

In the present exemplary embodiment, the enlarged image 360 is erased in the case where the pointer image 200 is moved to the non-display location 95 as described above, for example.

Besides, the CPU 11a of the server device 10 may hide the enlarged image 360 in the case where the user has performed an operation determined in advance, even in the case where the pointer image 200 is placed on the enlarged image 360 being displayed or the file icon 310a.

Specifically, the CPU 11a of the server device 10 may hide the enlarged image 360 in the case where a specific location on the enlarged image 360 being displayed is selected using the pointer image 200, for example.

Figure 16:
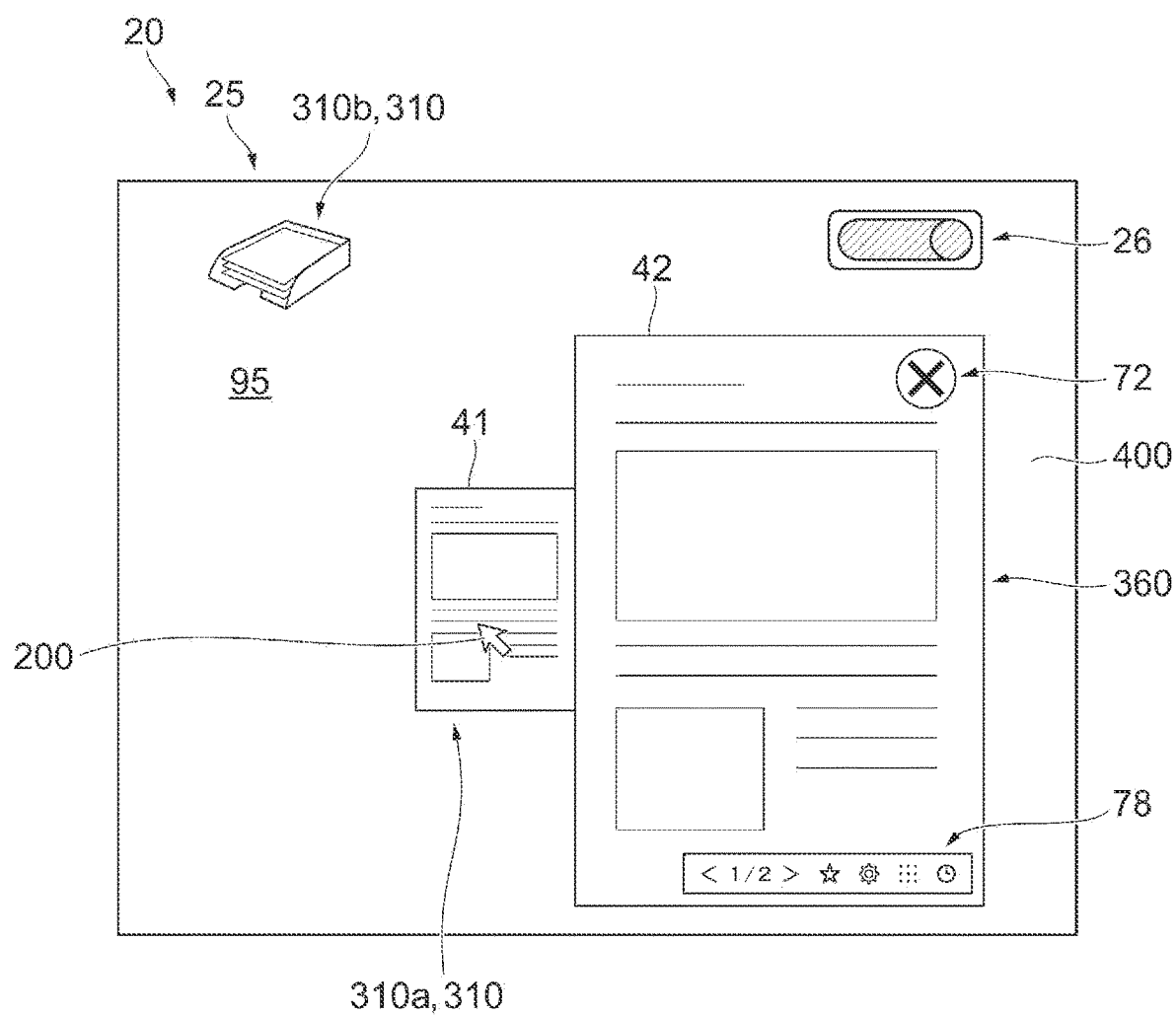
FIG. 16 illustrates another example of display on the display unit.

Specifically, an image 72 for receiving an instruction to erase the enlarged image 360 from the user may be displayed at a specific location on the enlarged image 360 as illustrated in FIG. 16 (which illustrates another example of display on the display unit 25), and the enlarged image 360 may be hidden in the case where the image 72 is selected by the user, for example.

More specifically, the enlarged image 360 may be hidden in the case where the location at which the image 72 is displayed is selected using the pointer image 20.

Besides, the CPU 11a of the server device 10 may hide the enlarged image 360 in the case where the user has performed a specific operation on a device that receives an operation to move the pointer image 200 from the user, for example.

Specifically, the CPU 11a of the server device 10 may hide the enlarged image 360 in the case where the user has performed a specific operation on a mouse which is an example of the device that receives an operation to move the pointer image 200 from the user, for example.

More specifically, the CPU 11a of the server device 10 may hide the enlarged image 360 in the case where the user has selected an option for erasing the enlarged image 360, which is displayed as one of a plurality of options to be displayed in the case where a right click is performed, for example.

Besides, the CPU 11a of the server device 10 may hide the enlarged image 360 in the case where the user has performed a specific operation on a different device other than the device that receives an operation to move the pointer image 200 from the user.

Specifically, the different device may be a keyboard, for example, and the enlarged image 360 may be hidden in the case where the user has pressed a specific key provided on the keyboard.

More specifically, the enlarged image 360 may be hidden in the case where the user has pressed an escape key provided on the keyboard, for example.

Besides, the timing to hide the enlarged image 360 may be varied in accordance with the position of the pointer image 200.

Figure 17:
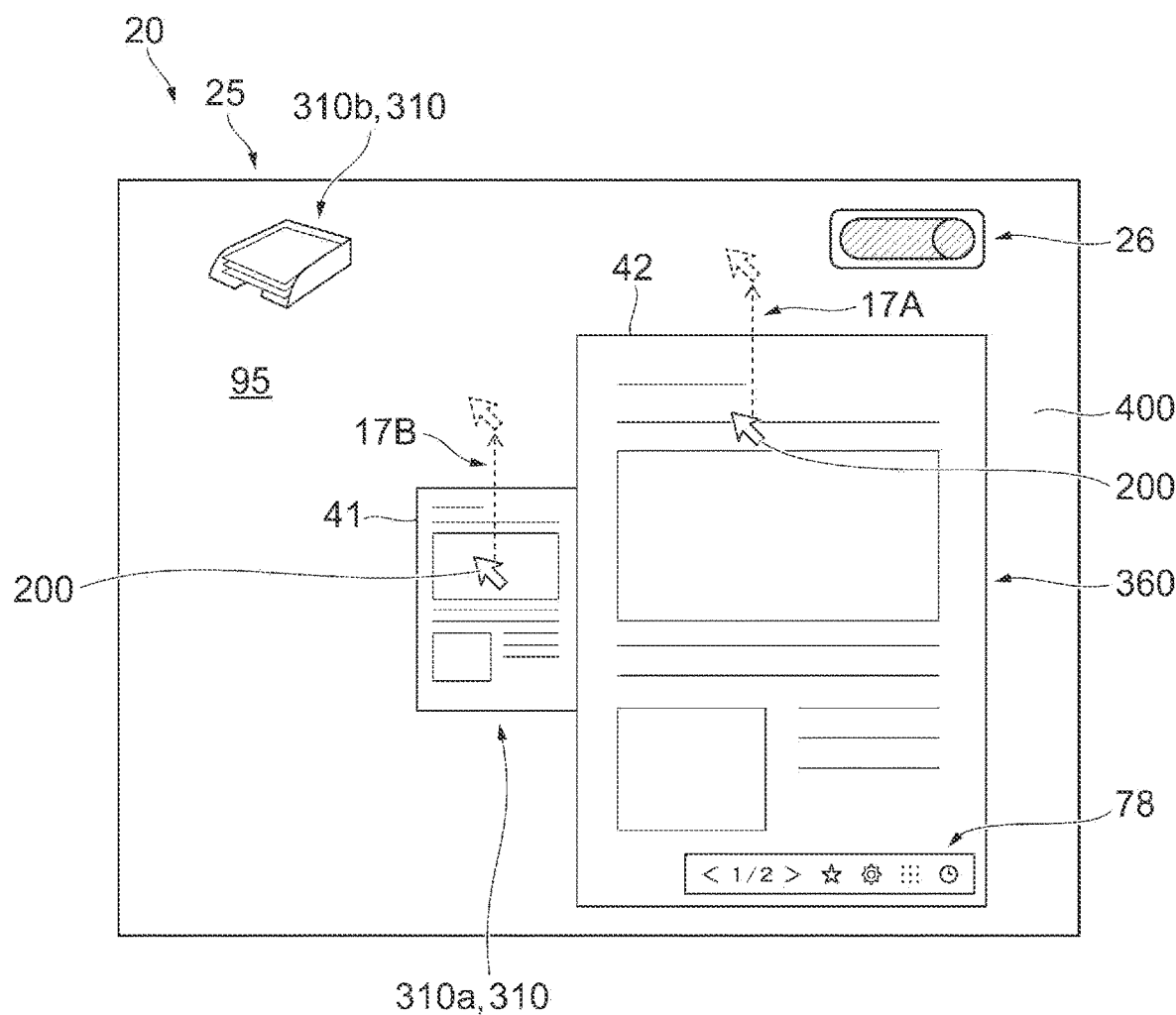
FIG. 17 illustrates deletion of the enlarged image.

Specifically, the CPU 11a of the server device 10 may hide the enlarged image 360 more quickly in the case where the pointer image 200 is moved from the file icon 310a to the non-display location 95 as indicated by symbol 17B in FIG. 17 (which illustrates erasure of the enlarged image) than in the case where the pointer image 200 is moved from the enlarged image 360 to the non-display location 95 as indicated by symbol 17A, for example.

The phrase "hide the enlarged image 360 more quickly in the case where the pointer image 200 is moved from the file icon 310a to the non-display location 95 than in the case where the pointer image 200 is moved from the enlarged image 360 to the non-display location 95" indicates that the time that elapses since the pointer image 200 is moved from the file icon 310a to the non-display location 95 until the enlarged image 360 is hidden is shorter than the time that elapses since the pointer image 200 is moved from the enlarged image 360 to the non-display location 95 until the enlarged image 360 is hidden.

In the present exemplary embodiment, as described above, display of the enlarged image 360 is maintained in the case where the pointer image 200 is placed on either of the enlarged image 360 and the file icon 310a being displayed.

In the present exemplary embodiment, on the other hand, the enlarged image 360 is hidden in the case where the pointer image 200 is moved to the non-display location 95 which is a location other than the display location at which the enlarged image 360 and the file image 310a are displayed.

In the case where the enlarged image 360 is to be hidden, the enlarged image 360 may be hidden more quickly in the case where the pointer image 200 is moved from the file icon 310a to the non-display location 95 than in the case where the pointer image 200 is moved from the enlarged image 360 to the non-display location 95.

The user occasionally desires to move the pointer image 200 from the file icon 310a on which the pointer image 200 has been placed to a different file icon 310a to display the enlarged image 360 corresponding to the different file icon 310a, for example.

In this case, if the enlarged image 360 that has been displayed so far is erased more quickly, the different file icon 310a which is located behind the enlarged image 360 is displayed more quickly, for example.

Figure 18:
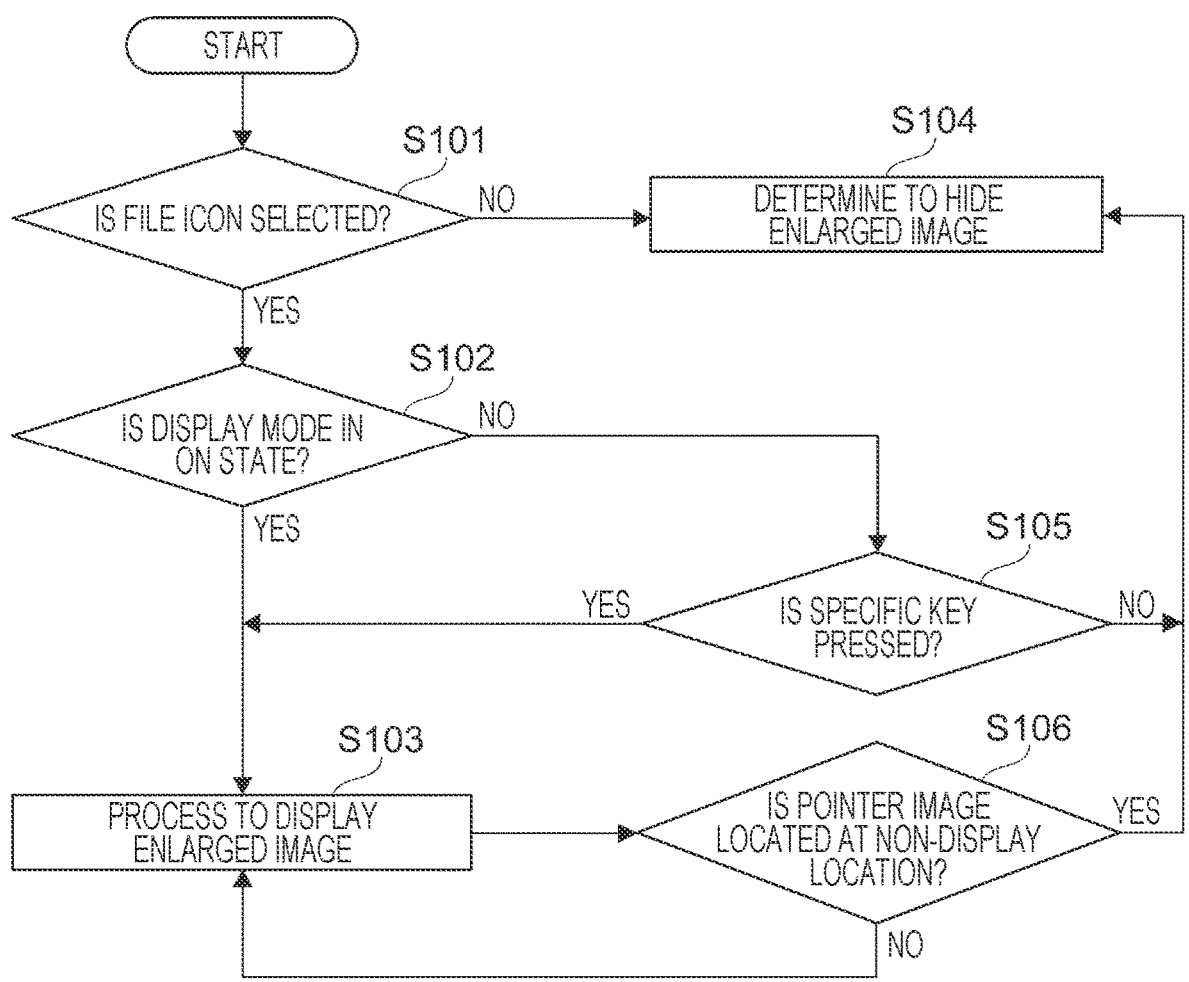
FIG. 18 is a flowchart illustrating the flow of a process.

FIG. 18 is a flowchart illustrating the flow of the process discussed above.

The flowchart indicates an example of the process for the case where the enlarged image 360 is displayed in the case where the display mode is in the ON state or a specific key is pressed.

In the present exemplary embodiment, first, it is determined whether or not a file icon 310a is selected by the user (step S101).

Then, in the case where it is determined in step S101 that a file icon 310a is selected, it is determined whether or not the display mode is in the ON state (step S102).

In the case where it is not determined in step S101 that a file icon 310a is selected, on the other hand, the process proceeds to step S104. In the process in step S104, it is determined to hide the enlarged image 360.

In the case where it is determined in step S102 that the display mode is in the ON state, a process to display the enlarged image 360 is performed (step S103).

On the other hand, in the case where it is not determined in step S102 that the display mode is in the ON state, that is, in the case where the display mode is in the OFF state, it is determined whether or not a specific key such as the Ctrl key is pressed (step S105).

In the case where it is determined in step S105 that a specific key is pressed, the process proceeds to step S103. Consequently, the enlarged image 360 is displayed in this case.

In the case where it is not determined in step S105 that a specific key is pressed, on the other hand, the process proceeds to step S104. Consequently, it is determined to hide the enlarged image 360 in this case.

After the process in step S103, it is determined whether or not the pointer image 200 is located at the non-display location 95 (step S106).

In the case where it is determined in step S106 that the pointer image 200 is located at the non-display location 95, the process proceeds to step S104. In step S104, it is determined to hide the enlarged image 360. Consequently, the enlarged image 360 is hidden.

In the case where it is not determined in step S106 that the pointer image 200 is located at the non-display location 95, on the other hand, the process returns to step S103. In this case, display of the enlarged image 360 is continued.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processor configured to:
   display an enlarged image that corresponds to a file image and that is larger in display size than the file image on a display unit in a case where the file image is selected, the file image being an image corresponding to a file and displayed on the display unit;
   maintain display of the enlarged image while a pointer image that indicates a location on the display unit at which an operation is performed by a user is located on any of the enlarged image and the file image;
   maintain display of the enlarged image while the pointer image is located on a gap that is included in a non-display location and is present between the file image and the enlarged image, the non-display location including all locations in a workspace except a location of the file image and a location of the enlarged image; and
   unless a predetermined criteria is satisfied, hide the enlarged image in all cases where the pointer image is located in the non-display location at a position other than the gap.

2. The information processing system according to claim 1,
wherein the processor is configured to display the enlarged image on the display unit in a case where the user performs a specific operation on the file image in a mode in which the enlarged image is displayed when the user performs the specific operation.

3. The information processing system according to claim 1,
wherein the predetermined criteria is satisfied in a case where the user performs an operation determined in advance with the enlarged image displayed.

4. The information processing system according to claim 1,
wherein the predetermined criteria is satisfied in a case where a time for which the pointer image is located off the enlarged image is less than a threshold determined in advance, even in a case where the pointer image is moved off the enlarged image being displayed.

5. The information processing system according to claim 1,
wherein the predetermined criteria is satisfied in a case where a separation distance between an edge of the enlarged image and the pointer image is less than a threshold determined in advance, even in a case where the pointer image is moved off the enlarged image being displayed.

6. The information processing system according to claim 1,
wherein the processor is configured to:
   hide the enlarged image within a first time period in a case where the pointer image is moved from the file image to the non-display location; and
   hide the enlarged image within a second time period in a case where the pointer image is moved from the enlarged image to the non-display location,
wherein the first time period is a shorter time period than the second time period.

7. The information processing system according to claim 1,
wherein the processor is configured to hide the enlarged image in a case where the pointer image placed on the enlarged image is moved onto the file image.

8. The information processing system according to claim 1,
wherein the processor is configured to:
   display the enlarged image on the display unit in a case where the pointer image is placed on the file image and the file image is selected using the pointer image; and
   in a case where the enlarged image is displayed, move the pointer image on the file image onto the enlarged image without an instruction from the user.

9. The information processing system according to claim 1,
wherein the processor is configured to:
   display the enlarged image on the display unit in a case where the pointer image is placed on the file image and the file image is selected using the pointer image; and maintain display of the enlarged image until the pointer image on the file image is moved onto the enlarged image in a case where the enlarged image is displayed.

10. The information processing system according to claim 1,
wherein the processor is configured to:
display the enlarged image on the display unit in a case where the pointer image is placed on the file image and the file image is selected using the pointer image with the user performing a specific operation determined in advance; and
maintain display of the enlarged image in a case where the pointer image is placed on the enlarged image being displayed, even if the specific operation is not performed any more.

11. The information processing system according to claim 10,
wherein the processor is configured to hide the enlarged image in a case where the pointer image is positioned at a location other than on the enlarged image being displayed, when the specific operation is not performed any more.

12. The information processing system according to claim 1,
wherein the processor is configured to:
display, on the display unit, reception display for receiving an operation by the user for the enlarged image being displayed; and
maintain display of the enlarged image also in a case where the pointer image is placed on the reception display.

13. The information processing system according to claim 12,
wherein the processor is configured to maintain display of the enlarged image even in a case where the pointer image is placed on the reception display positioned at a location off a display region of the enlarged image.

14. The information processing system according to claim 12,
wherein the processor is configured not to display the reception display in a case where the pointer image is located on the file image, and configured to display the reception display in a case where the pointer image is located on the enlarged image.

15. A non-transitory computer readable medium storing a program causing a computer to perform a process comprising:
displaying an enlarged image that corresponds to a file image and that is larger in display size than the file image on a display unit in a case where the file image is selected, the file image being an image corresponding to a file and displayed on the display unit; and
maintaining display of the enlarged image while a pointer image that indicates a location on the display unit at which an operation is performed by a user is located on any of the enlarged image and the file image;
maintaining display of the enlarged image while the pointer image is located on a gap that is included in a non-display location and is present between the file image and the enlarged image, the non-display location including all locations in a workspace except a location of the file image and a location of the enlarged image; and
unless a predetermined criteria is satisfied, hiding the enlarged image in all cases where the pointer image is located in the non-display location at a position other than the gap.

* * * * *